US007569296B2

(12) United States Patent
Okazaki

(10) Patent No.: US 7,569,296 B2
(45) Date of Patent: Aug. 4, 2009

(54) METHOD FOR OPERATING VEHICLE-MOUNTED FUEL CELL STACK

(75) Inventor: Koji Okazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 823 days.

(21) Appl. No.: 11/048,682

(22) Filed: Jan. 31, 2005

(65) Prior Publication Data

US 2005/0171659 A1 Aug. 4, 2005

(30) Foreign Application Priority Data

Jan. 30, 2004 (JP) ............................. 2004-024755

(51) Int. Cl.
*H01M 8/12* (2006.01)
*H01M 8/00* (2006.01)
(52) U.S. Cl. .............................. 429/24; 429/13; 429/26; 429/22
(58) Field of Classification Search ................... 429/26, 429/13, 24
See application file for complete search history.

(56) References Cited

U.S. PATENT DOCUMENTS

| 4,175,165 | A |   | 11/1979 | Adlhart |             |
|-----------|---|---|---------|---------|-------------|
| 5,776,624 | A | * | 7/1998  | Neutzler | ............ 429/26 |
| 6,140,266 | A | * | 10/2000 | Corrigan et al. | ............ 502/439 |
| 2001/0049040 | A1 | * | 12/2001 | Grune et al. | ............ 429/26 |
| 2002/0168556 | A1 | * | 11/2002 | Leboe et al. | ............ 429/13 |

FOREIGN PATENT DOCUMENTS

| JP | A-54-22537 |   | 2/1979 |
|----|-----------|---|--------|
| JP | 63218167 A | * | 9/1988 |
| JP | 2000-514745 |  | 11/2000 |
| JP | 2001315680 A | * | 11/2001 |
| WO | WO-98/04013 |  | 1/1998 |

\* cited by examiner

*Primary Examiner*—Patrick Ryan
*Assistant Examiner*—Zachary Best
(74) *Attorney, Agent, or Firm*—Lahive & Cockfield, LLP; Anthony A. Laurentano

(57) ABSTRACT

For controlling operation of a vehicle-mounted fuel cell stack, a determination is made as to whether consumed electric power, measured during travel of a vehicle, is greater than standard electric power. If so, a generated electric power amount (output) of a fuel cell stack is judged to be great, in which case not only a fan is activated for rotation but also an air allocation mechanism is operated in an opening direction. In an alternative, information of a traveling velocity is also taken into account. Namely, when the fuel cell stack is operated in a vehicle traveling state where the vehicle's traveling velocity does not increase despite an increase in the electric power output from the cell stack, not only the fan is activated for rotation but also the air allocation mechanism is operated in the opening direction, so that a cooling-air flow amount can be increased.

2 Claims, 18 Drawing Sheets

FIG. 14
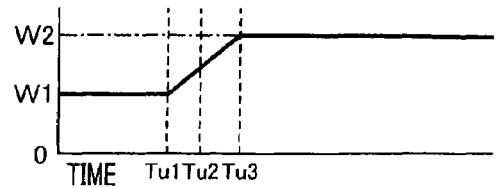
(a) GENERATED POWER AMOUNT
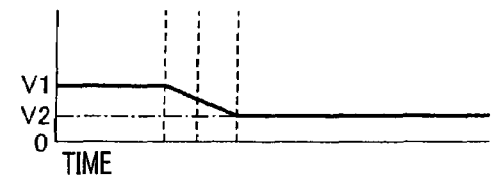
(b) VEHICLE VELOCITY
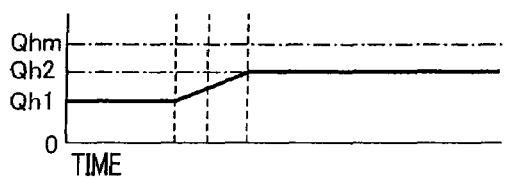
(c) HYDROGEN FLOW AMOUNT
(d) TEMPERATURE OF POWER GENERATING CELL
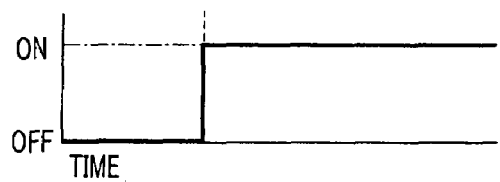
(e) AIR-SUCKING-IN FAN
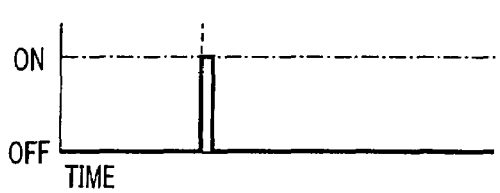
(f) OPENING OPERATION OF OPENING/CLOSING DRIVE
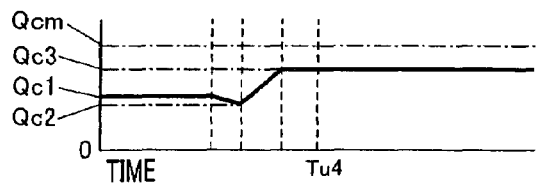
(g) COOLING-AIR FLOW AMOUNT
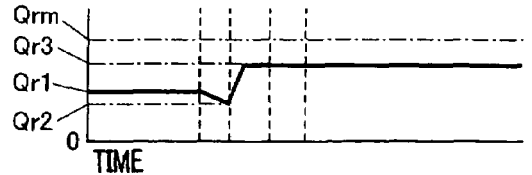
(h) REACTING-AIR FLOW AMOUNT

METHOD FOR OPERATING VEHICLE-MOUNTED FUEL CELL STACK

FIELD OF THE INVENTION

The present invention relates to an improved method for operating a vehicle-mounted fuel cell stack.

BACKGROUND OF THE INVENTION

Fuel-cell-powered vehicles known today use hydrogen as their fuel; specifically, these fuel-cell-powered vehicles are provided with a traveling motor and a fuel cell stack that generates electric power using hydrogen and oxygen, so that they can travel by electricity. One example of a conventional method for operating a fuel cell assembly is known from Japanese Patent Laid-Open Publication No. SHO-54-22537, and one example of a conventional method for operating a fuel cell unit mounted on an automotive vehicle is known from Japanese Patent Laid-Open Publication No. 2000-514745 (WO98/04013).

FIG. 18 is a perspective view showing a fundamental construction and operation of the fuel cell assembly disclosed in the above-mentioned SHO -54-22537 publication. The disclosed fuel cell assembly includes fuel cell laminates 201, and bipolar plates 202 stacked alternately with the fuel cell laminates 201 and each having fuel gas channels 203 and oxygen-containing gas channels 204. With such arrangements, the fuel cell assembly generates electric power using the fuel gas and oxygen in the air, and the fuel cell laminates 201 can be cooled naturally with the air.

The fuel cell unit disclosed in the above-mentioned No. 2000-514745 published Japanese translation includes a cooling system that cools fuel cells using traveling wind produced by traveling of an electric vehicle. The disclosed fuel cell unit further includes a pressure source (e.g., air blower or fan) for compulsorily passing air (traveling wind) through the cooling system. Traveling velocity of the vehicle is first detected to determine whether or not the vehicle is currently traveling at low speed, and then the fuel cells are cooled by the fan if the vehicle has been determined to be currently traveling at low speed. Alternatively, an external or ambient temperature is measured to determine whether or not the measured ambient temperature is relatively high, and then the fuel cells are cooled by the fan if the measured ambient temperature has been determined to be relatively high.

However, the fuel cell assembly disclosed in the SHO-54-22537 publication is not satisfactory in that heat produced in the fuel cell laminates 201 can not be dissipated or removed easily. Thus, there may arise a possibility of the temperature of the fuel cells getting excessively high, depending on environmental conditions, etc.

The fuel cell unit disclosed in the above-mentioned 2000-514745 publication is normally incorporated where a radiator of the vehicle is mounted, so that the cell unit (fuel cell stack) can be cooled directly by the traveling wind. In this case, however, there is a need for appropriately allocating the externally-introduced air for two purposes, cooling and electric-power generating purposes, in order to appropriately deal with an increase/decrease in the temperature of the fuel cell stack. As well known in the art, the fuel cells have an appropriate reacting temperature range suitable for electric power generation; in an initial, startup period, for example, the fuel cells have a relatively low temperature and thus need not be cooled. However, in the disclosed fuel cell unit, the temperature of the fuel cells can not increase easily up to an appropriate level, during its initial, startup period, because the fan is activated as long as the vehicle is in any of low-speed traveling states (including an idling state).

SUMMARY OF THE INVENTION

In view of the foregoing prior art problems, it is an object of the present invention to provide an improved method for operating a vehicle-mounted fuel cell stack which permits appropriate allocation between cooling air and reacting air in accordance with operating (electric-power generating) states of the fuel cells, and which can also appropriately control electric power generation and temperature of the fuel cells.

According to a first aspect of the present invention, there is provided an improved method for operating a vehicle-mounted fuel cell stack. The vehicle-mounted fuel cell stack, operated in accordance with the inventive method, comprises: (a) a plurality of power generating cells each of which is generally in a shape of a flat plate and includes a solid polymer electrolyte membrane sandwiched between an anode electrode and a cathode electrode, each of the power generating cells generating electric power through reaction, via the solid polymer electrolyte membrane, between fuel gas and reacting air supplied to the anode electrode and cathode electrode, respectively, each of the power generating cells having, in a front end portion thereof that faces forward when the fuel cell stack is mounted on a vehicle, a reacting-air introduction opening for introducing the reacting air into the power generating cell; (b) one or more cooling cells stacked alternately with the power generating cells, each of the cooling cells including two opposed flat plates for passage therebetween of cooling air and having, in a front end portion thereof, a cooling-air introduction opening for introducing the cooling air between the opposed flat plates; and (c) an air allocation mechanism, disposed in front of the front end portions of the power generating cells and cooling cells, for allocating traveling wind or a stream of air, produced via a fan, to the reacting-air introduction openings and to the cooling-air introduction openings as the reacting air and cooling air, respectively, the air allocation mechanism being capable of adjusting an allocation ratio between the reacting air and the cooling air. The method of the present invention comprises: a power measurement step of measuring electric power consumed by a traveling motor for causing the vehicle to travel; a velocity measurement step of measuring a traveling velocity of the vehicle; a step of determining standard electric power that corresponds to the consumed electric power measured by the power measurement step, the standard electric power representing a level of electric power that would be consumed by the traveling motor if the vehicle travels on flat land at the traveling velocity measured by the velocity measurement step; and a step of, when the measured consumed electric power is greater than the standard electric power, placing the fan in an activated state for rotation and also performing control to increase an allocated amount of the cooling air via the air allocation mechanism.

In order to acquire a current traveling state of the vehicle, the measurement steps measure electric power consumed by the traveling motor for causing the vehicle to travel and a traveling velocity of the vehicle. Then, standard electric power that corresponds to the measured consumed electric power is determined; the standard electric power represents a level of electric power that would be consumed by the traveling motor if the vehicle travels on flat land at the measured traveling velocity. Then, it is determined whether or not the measured consumed electric power is greater than the standard electric power. When the measured consumed electric power has been determined to be greater than the standard electric power, the generated electric power amount (output) of the fuel cell stack is judged to be great, in which case not only the fan is activated for rotation but also the air allocation mechanism is operated in an opening direction, i.e. in such a direction as to increase the allocated amount of the cooling air. In an alternative, information of a traveling velocity of the vehicle is also taken into account. Namely, when the fuel cell stack is operated in a traveling state of the vehicle where the vehicle's traveling velocity does not increase despite an increase in the electric power output from the cell stack, not only the fan is activated for rotation but also the air allocation mechanism is operated in the opening direction, so that the cooling-air flow amount can be increased.

With the arrangements that, when the vehicle is traveling in a state where the electric power output from the cell stack increases or where the vehicle's traveling velocity does not increase despite an increase in the electric power output, not only the fan is activated for rotation but also control is performed to increase the allocated amount of the cooling air via the air allocation mechanism, the present invention can increase, as necessary, the amount of the cooling air flowing into the cooling cells and thereby allows the temperature of the power generating cells to be reliably maintained between upper and lower limits of an appropriate operating temperature range of the power generating cells by means of the cooling cells.

According to a second aspect of the present invention, there is provided an improved method for operating a vehicle-mounted fuel cell stack of the type discussed above in relation to the first aspect. The method of the invention is characterized by comprising: a power measurement step of measuring electric power consumed by a traveling motor for causing the vehicle to travel; a velocity measurement step of measuring a traveling velocity of the vehicle; a step of determining standard electric power that corresponds to the consumed electric power measured by the power measurement step, the standard electric power representing a level of electric power that would be consumed by the traveling motor if the vehicle travels on flat land at the traveling velocity measured by the velocity measurement step; and a step of, when the measured consumed electric power is smaller than the standard electric power, placing the fan in a deactivated state and also performing control to decrease an allocated amount of the cooling air via the air allocation mechanism.

When the measured consumed electric power has been determined to be smaller than the standard electric power, the generated electric power amount (output) of the fuel cell stack is judged to be small, in which case not only the fan is deactivated but also the air allocation mechanism is operated in a closing direction, i.e. in such a direction as to decrease the allocated amount of the cooling air. In an alternative, information of a traveling velocity of the vehicle is also taken into account. Namely, when the fuel cell stack is operated in a traveling state of the vehicle where the vehicle's traveling velocity does not decrease despite a decrease in the electric power output from the cell stack, not only the fan is deactivated but also the air allocation mechanism is operated in the closing direction.

With the arrangements that, when the vehicle is traveling in a state where the electric power output from the cell stack decreases or where the vehicle's traveling velocity does not decrease despite a decrease in the electric power output, not only the fan is deactivated but also control is performed to decrease the allocated amount of the cooling air via the air allocation mechanism, the present invention can decrease, as necessary, the amount of the cooling air flowing into the cooling cells and thereby allows the temperature of the power generating cells to be reliably maintained between the upper and lower limits of the appropriate operating temperature range of the power generating cells by means of the cooling cells.

According to a third aspect of the present invention, there is provided an improved method for operating a vehicle-mounted fuel cell stack of the type discussed above in relation to the first aspect. The method of the invention is characterized by comprising: a temperature measurement step of measuring an ambient temperature; and a step of, when the ambient temperature measured by the temperature measurement step is higher than a preset standard temperature, placing the fan in an activated state for rotation and also performing control to increase an allocated amount of the cooling air via the air allocation mechanism.

Namely, when the measured ambient temperature is higher than the preset standard temperature, not only the fan is placed in an activated state for rotation but also control is performed to increase the allocated amount of the cooling air via the air allocation mechanism. Thus, where the fuel cell stack operates in the vehicle under an environment where the ambient temperature exceeds the preset standard temperature, the present invention can increase the amount of the cooling air flowing into the cooling cells and thereby allows the temperature of the power generating cells to be reliably maintained between the upper and lower limits of the appropriate operating temperature range of the power generating cells by means of the cooling cells.

Further, according to a fourth aspect of the present invention, there is provided an improved method for operating a vehicle-mounted fuel cell stack of the type discussed above in relation to the first aspect. The method of the invention is characterized by comprising: a temperature measurement step of measuring an ambient temperature; and a step of, when the ambient temperature measured by the temperature measurement step is lower than a preset standard temperature, placing the fan in a deactivated state and also performing control to decrease an allocated amount of the cooling air via the air allocation mechanism.

Namely, when the measured ambient temperature is lower than the preset standard temperature, not only the fan is placed in a deactivated state but also control is performed to decrease the allocated amount of the cooling air via the air allocation mechanism. Thus, where the fuel cell stack operates in the vehicle under an environment where the ambient temperature falls below the preset standard temperature, the present invention can decrease the amount of the cooling air flowing into the cooling cells and thereby allows the temperature of the power generating cells to be reliably maintained between the upper and lower limits of the appropriate operating temperature range of the power generating cells by means of the cooling cells.

BRIEF DESCRIPTION OF THE DRAWINGS

Certain preferred embodiments of the present invention will hereinafter be described in detail, by way of example only, with reference to the accompanying drawings, in which:

FIG. 14 is a diagram explanatory of how the vehicle-mounted fuel cell stack is operated or controlled in accordance with a first aspect of a fuel-cell-stack operation method of the present invention;

DETAILED DESCRIPTION OF THE PREFERRED EMBODIMENTS

Figure 1:
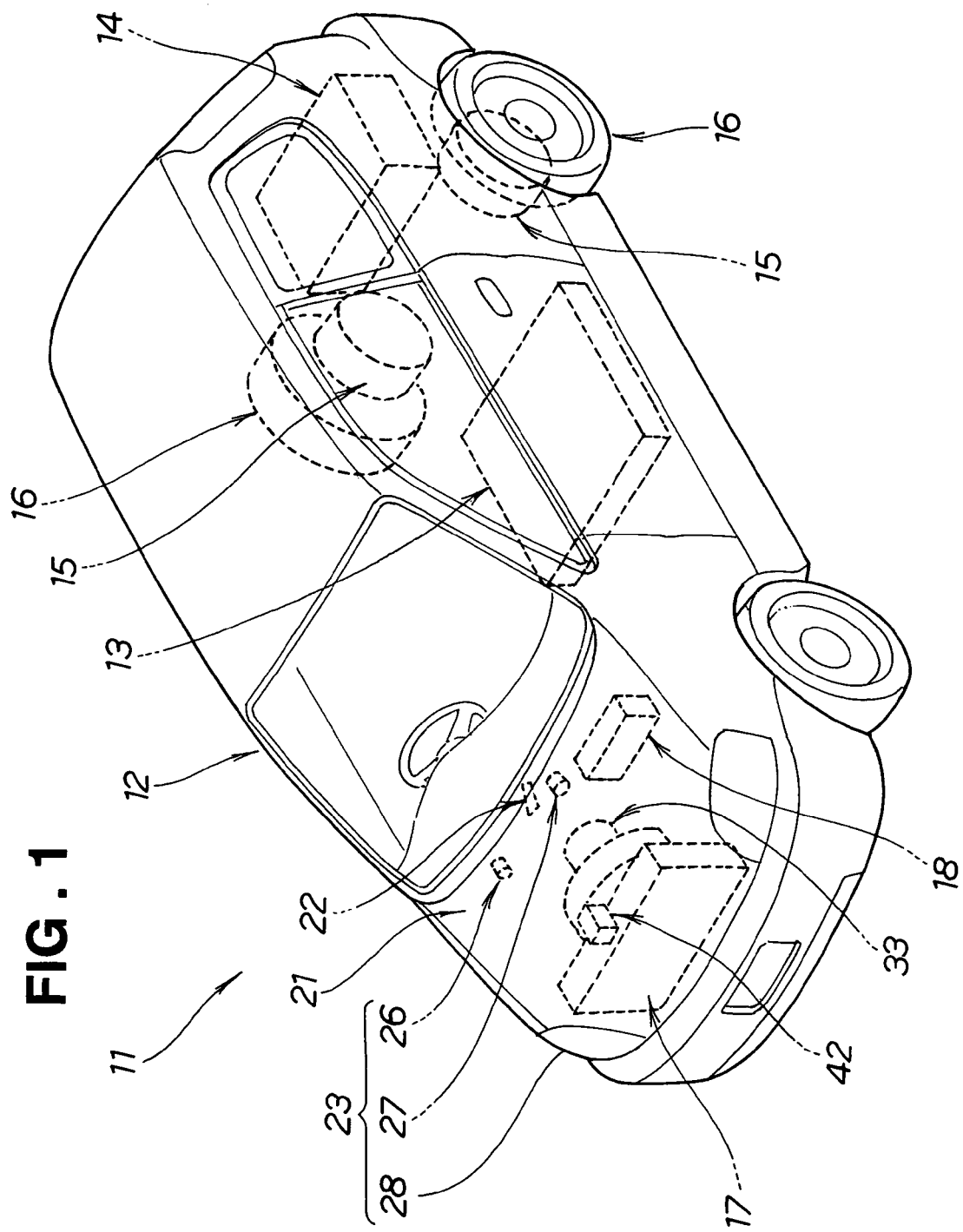
FIG. 1 is a perspective view of a vehicle employing a vehicle-mounted fuel cell stack operated or controlled in accordance with an embodiment of the present invention.

FIG. 1 is a perspective view of a vehicle employing a vehicle-mounted fuel cell stack controlled or operated in accordance with the present invention. The vehicle 11, which is a fuel-cell-powered vehicle running on hydrogen fuel, includes an electricity storage device 13 disposed centrally in a vehicle body 12, a hydrogen storage section 14 disposed in a rear portion of the vehicle body 12, traveling motors 15 disposed in rear portions of the vehicle body 12, and rear road wheels 16 coupled to the traveling motors 15. The vehicle 11 further includes a fuel cell stack 17 disposed in a front portion of the vehicle body 12, and a fuel cell control device 18 for controlling the vehicle-mounted fuel cell stack 17. In the figure, reference numeral 21 represents an engine room, 22 an accelerator pedal, 23 auxiliary devices, 24 an ambient temperature sensor, and 25 a vehicle velocity sensor. The auxiliary devices 23 are electric devices other than the traveling motors 15, such as a wiper motor 26, air conditioner motor 27 and head lamps 28.

Figure 2:
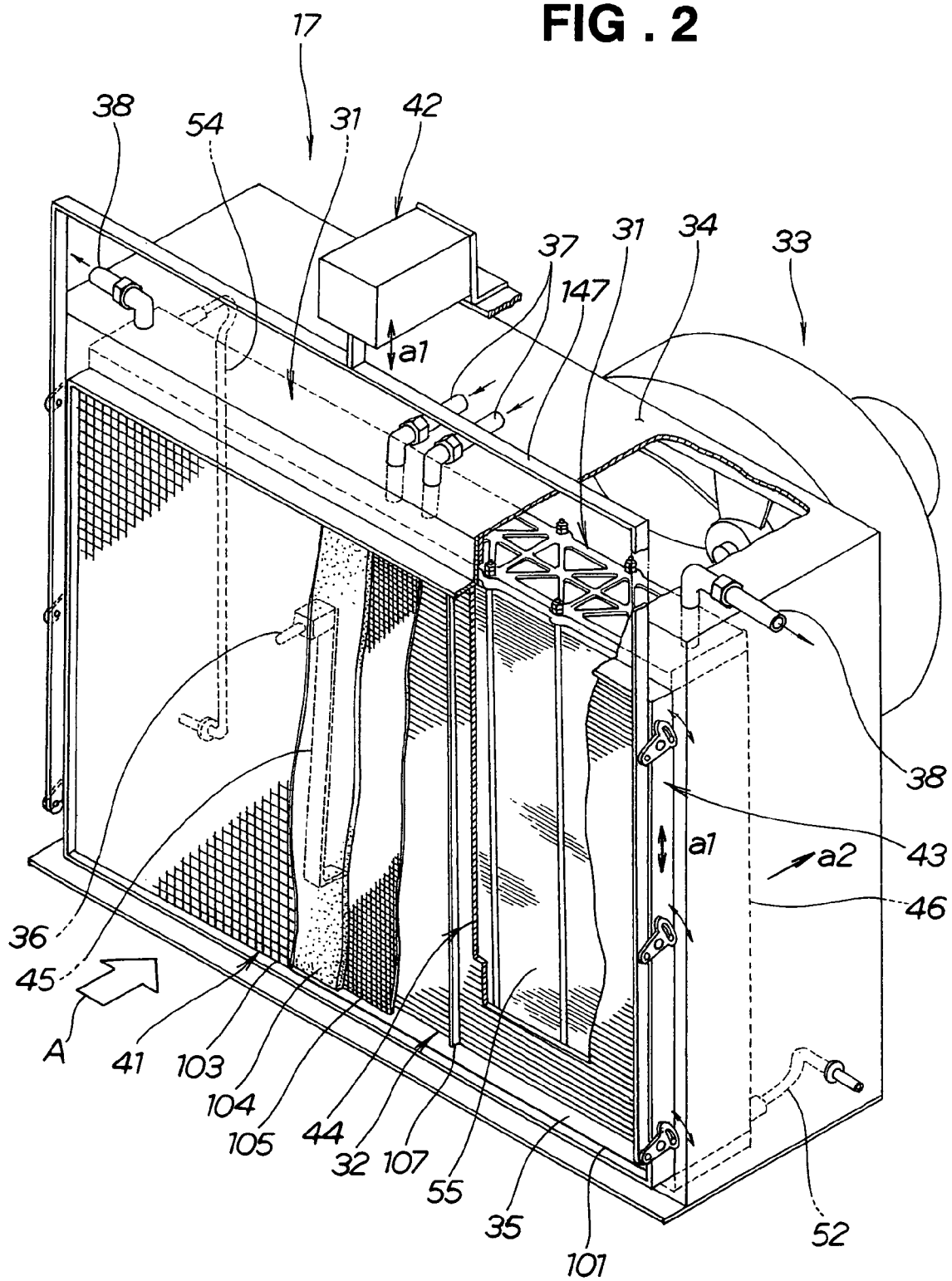
FIG. 2 is a perspective view of the vehicle-mounted fuel cell stack of FIG. 1.

FIG. 2 is a perspective view of the vehicle-mounted fuel cell stack operated or controlled in accordance with the present invention. The fuel cell stack 17 includes cell stack sections 31, an air allocation mechanism 32 disposed in front of the cell stack sections 31, a fan 33 disposed behind of the cell stack sections 31, and a cell case 34 covering the cell stack sections 31. Reference numeral 35 represents an air introducing side of the cell stack sections 31. The fuel cell stack 17 also includes temperature sensors 36 (see also FIG. 3) disposed behind of the cell stack sections 31 for detecting a temperature of the fuel cells, hydrogen supply tubes 37 for supplying hydrogen to the respective cell stack sections 31, hydrogen discharge tubes 38 for discharging hydrogen from the respective cell stack sections 31, and an air filter section 41 disposed in front of the air allocation mechanism 32.

The air allocation mechanism 32 includes an opening/closing drive source 42 disposed in an upper end portion of the air allocation mechanism 32, a link mechanism 43 coupled to the opening/closing drive source 42, and a valve section 44 driven via the link mechanism 43. The opening/closing drive source 42 may be in any desired form, such as a solenoid or motor, as long as it can drive the link mechanism 43 as indicated by double-headed arrow a1.

The fan 33 is a conventional electric fan that is positioned oppositely from the air introducing side 35 of the cell stack sections 31. Specifically, the fan 33 is of a sucking-in type that functions to compulsorily introduce air (white arrow A) from the air introducing side 35 into the cell stack sections 31 and then discharge the air A out of the cell case 34. In other words, the fan 33 compulsorily produces air A flowing through the fuel cell stack 17 in a front-to-rear direction of the vehicle 11 (see FIG. 1), i.e. flowing rearwardly from the air introducing side 35, through the interior of the stack sections 31, beyond a rear surface 46 of the stack sections 31 (namely, in a direction of arrow a2); note that the rear surface 46 is a stack surface facing rearward when the fuel cell stack 17 is mounted on the vehicle 11.

Each of the temperature sensors 36 may be of any desired specification as long as it is capable of measuring ambient temperatures in the range of −40 to 200° C. Each of the temperature sensors 36 is mounted near a discharge opening 97 of a power generating cell 61 (FIG. 5) via a bracket 45, and it measures a discharge temperature of reacting air Ar.

Figure 3:
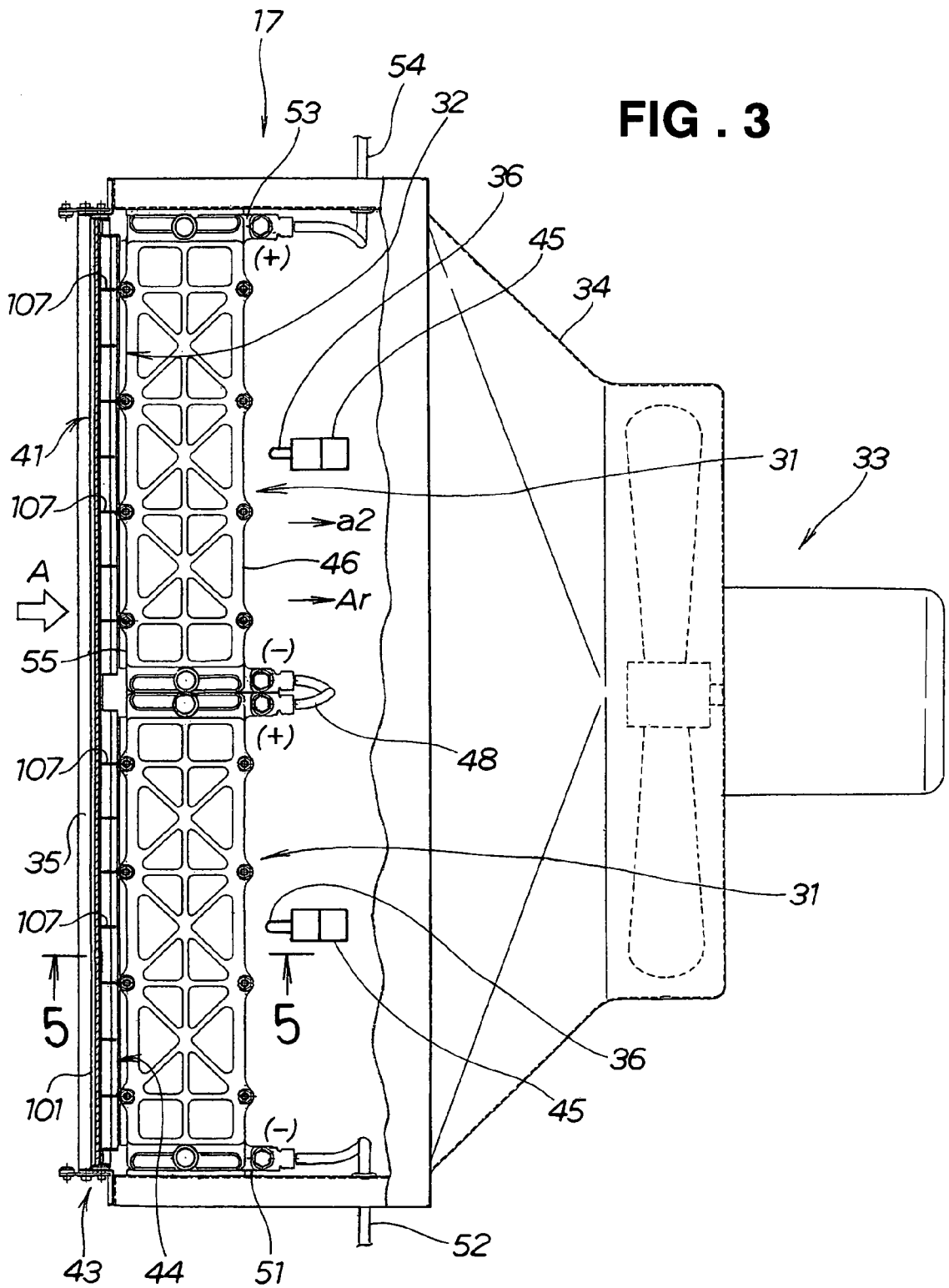
FIG. 3 is a plan view of the vehicle-mounted fuel cell stack.

FIG. 3 is a plan view of the vehicle-mounted fuel cell stack 17 operated in accordance with the present invention, which includes the left and right cell stack sections 31 disposed in side-by-side relation to each other, air allocation mechanism 32 disposed on the air introducing side 35 in front of the cell stack sections 31 and fan 33 disposed behind of the rear surface 46 of the cell stack sections 31 and secured to a rear end portion of the cell case 34. In the vehicle-mounted fuel cell stack 17, the left and right cell stack sections 31 are connected in series via a first cable 48, a second cable 52 is coupled to a minus terminal 51 located at the underside of the left cell stack section 31, and a third cable 54 is coupled to a plus terminal 53 at the topside of the right cell stack section 31. Reference numeral 55 represents a front surface of the cell stack sections 31, which is a stack surface that faces forward when the fuel cell stack 17 is mounted on the vehicle 11.

Figure 4:
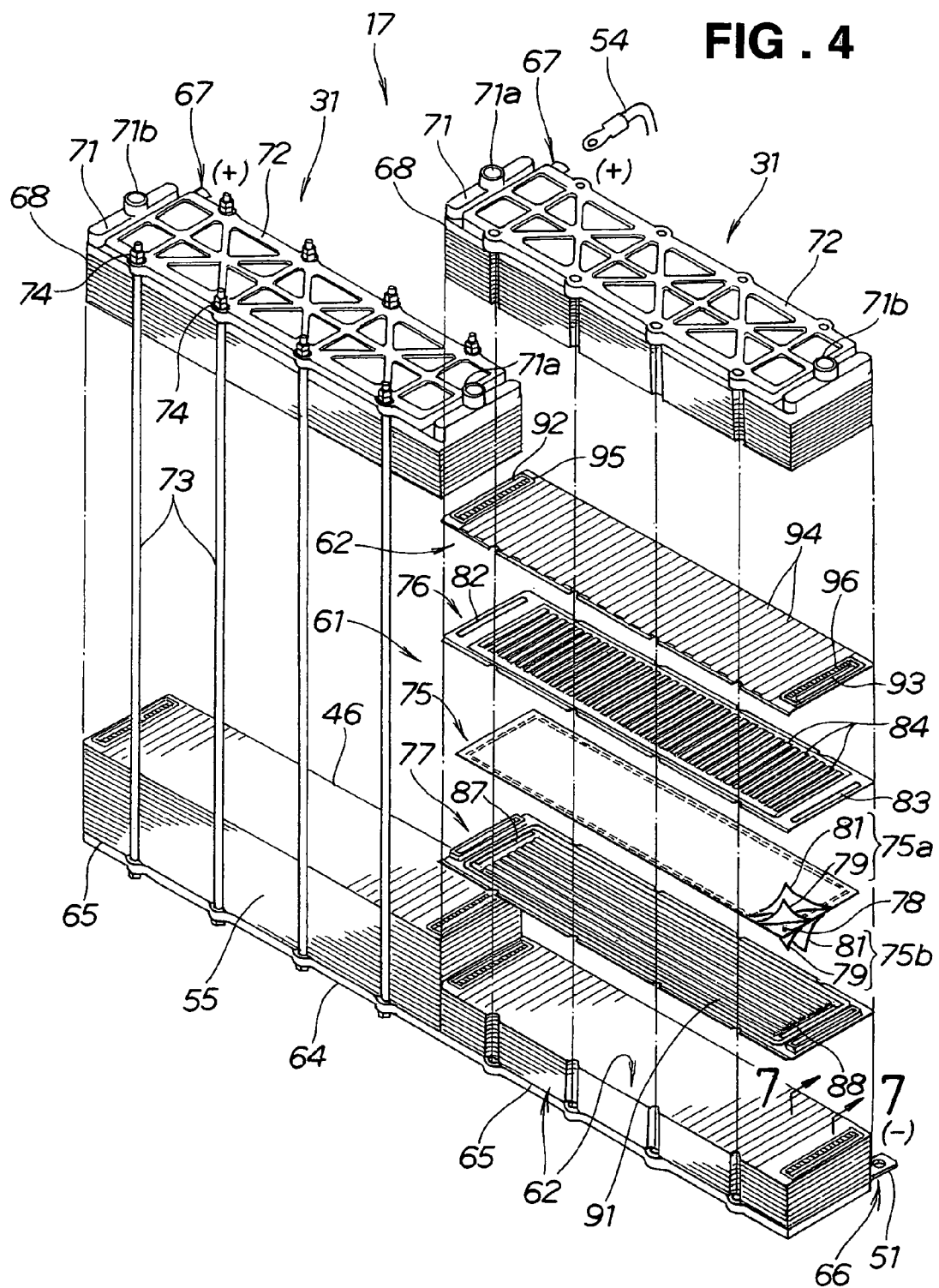
FIG. 4 is an exploded perspective view of the vehicle-mounted fuel cell stack.

FIG. 4 is an exploded perspective view of the vehicle-mounted fuel cell stack 17 operated in accordance with the present invention, which particularly shows details of the left and right cell stack sections 31.

Each of the cell stack sections 31 generally comprises a plurality of the power generating cells 61, and a plurality of cooling-air distributing plates 62 that are disposed between the power generating cells 61 so as to function as cooling cells. More specifically, an lower end (bottom) plate 64 of an area capable of placing thereon the left and right cell stack sections 31 is first provided, then a first insulating sheet 65 is placed on a left half portion of the lower end plate 64, a first collecting conductive plate 66 is placed on the insulating sheet 65, one of the cooling-air distributing plates 62 is placed on the first collecting conductive plate 66, one of the power generating cells 61 is placed on the cooling-air distributing plate 62, and then another one of the cooling-air distributing plates 62 is placed on the power generating cells 61. Such sequential placement of the cooling-air distributing plates 62 on the power generating cells 61 is repeated until a predetermined number of the power generating cells 61 are stacked alternately with the cooling-air distributing plates 62. Then, a second collecting conductive plate 67 is placed on the uppermost power generating cell 61, a second insulating sheet 68 is placed on the second collecting conductive plate 67, an upper end plate 71 is placed on the second insulating sheet 68, a backup plate 72 is placed on the upper end plate 71, and the backup plate 72 and lower end plate 64 are secured together by means of tie rods 73 and nuts 74. In this way, the left cell stack section 31 is constructed. The first collecting conductive plate 66 functions as a negative (minus) pole, while the second collecting conductive plate 67 functions as a positive (plus) pole.

Similarly, to provide the right cell stack section 31, the predetermined number of the power generating cells 61 are placed in a stacked configuration on a right half portion of the lower end plate 64 in the above-described manner. Backup plate 72 is placed on the stack of the power generating cells 61 via a second collecting conductive plate 67, second insulating sheet 68 and upper end plate 71. The backup plate 72 and lower end plate 64 are secured together by means of tie rods 73 and nuts 74.

Each of the power generating cells 61 includes an electrolyte/electrode structure 75, a cathode-side separator 76 held in contact with an oxygen-touching surface of the electrolyte/electrode structure 75, and an anode-side separator 77 held in contact with a hydrogen-touching surface of the electrolyte/electrode structure 75.

The electrolyte/electrode structure 75 is constructed of a solid polymer electrolyte 78 (e.g., made of perfluoro-carbon sulfonic acid type resin), electrode catalyst layers 79 formed on opposite surfaces of the solid polymer electrolyte 78, and gas diffusion layers 81 formed on the electrode catalyst layers 79.

In the illustrated example, the solid polymer electrolyte (membrane) 78 is, for example, a "Nafion" (trademark) electrolyte membrane made by DuPont Chemicals, Inc. The electrode catalyst layer 79 is formed, for example, by applying a platinum catalyst to a carbon carrier. The gas diffusion layer 81 is formed of a porous carbon paper, carbon cloth, non-woven carbon cloth, or the like.

Cathode electrode 75*a* is constructed of the electrode catalyst layer 79 and gas diffusion layer 81 provided on an oxygen-side surface of the solid polymer electrolyte 78, and an anode electrode 75*b* is constructed of the electrode catalyst layer 79 and gas diffusion layer 81 provided on a hydrogen-side surface of the polymer electrolyte 78.

The cathode-side separator 76 has a hydrogen supply opening 82 formed near its one end (inner end in the illustrated example), a hydrogen discharge opening 83 formed near its other end (outer end in the illustrated example), and a plurality of linear reacting-air flow passageways (or channels) 84 each extending in the front-to-rear direction, i.e. from near the front surface 55 toward the rear surface 46 of the cell stack section 31. Details of the cathode-side separator 76 will be discussed later.

The anode-side separator 77 has hydrogen supply openings 87 formed near its one (or inner) end (see also FIG. 10), hydrogen discharge openings 88 formed near its other (outer) end (see also FIG. 10), and a plurality of linear hydrogen flow passageways (channels) 91 for directing hydrogen from the hydrogen supply openings 87 to the hydrogen discharge openings 88 and also supplying hydrogen to the electrolyte/electrode structure 75. Details of the anode-side separator 77 will be discussed later.

The cooling cells (cooling-air distributing plates) 62 each have a hydrogen supply opening 92 formed near its one end (inner end in the illustrated example), a hydrogen discharge opening 93 formed near its other end (outer end in the illustrated example), a plurality of linear cooling-air flow passageways (channels) 94 extending in the front-to-rear direction, i.e. from near the front surface 55 toward the rear surface 46 of the cell stack section 31, a first flow adjusting member 95 secured near the hydrogen supply opening 92, and a second flow adjusting member 96 secured near the hydrogen discharge opening 93. Details of the cooling cell (cooling-air distributing plate) 62 will be discussed later.

In the illustrated example, the cooling cell (cooling-air distributing plate) 62 is a thin plate formed of a conductive metal material. The upper end plate 71 has a hydrogen inlet port 71*a*, and a hydrogen outlet port 71*b*.

Figure 5:
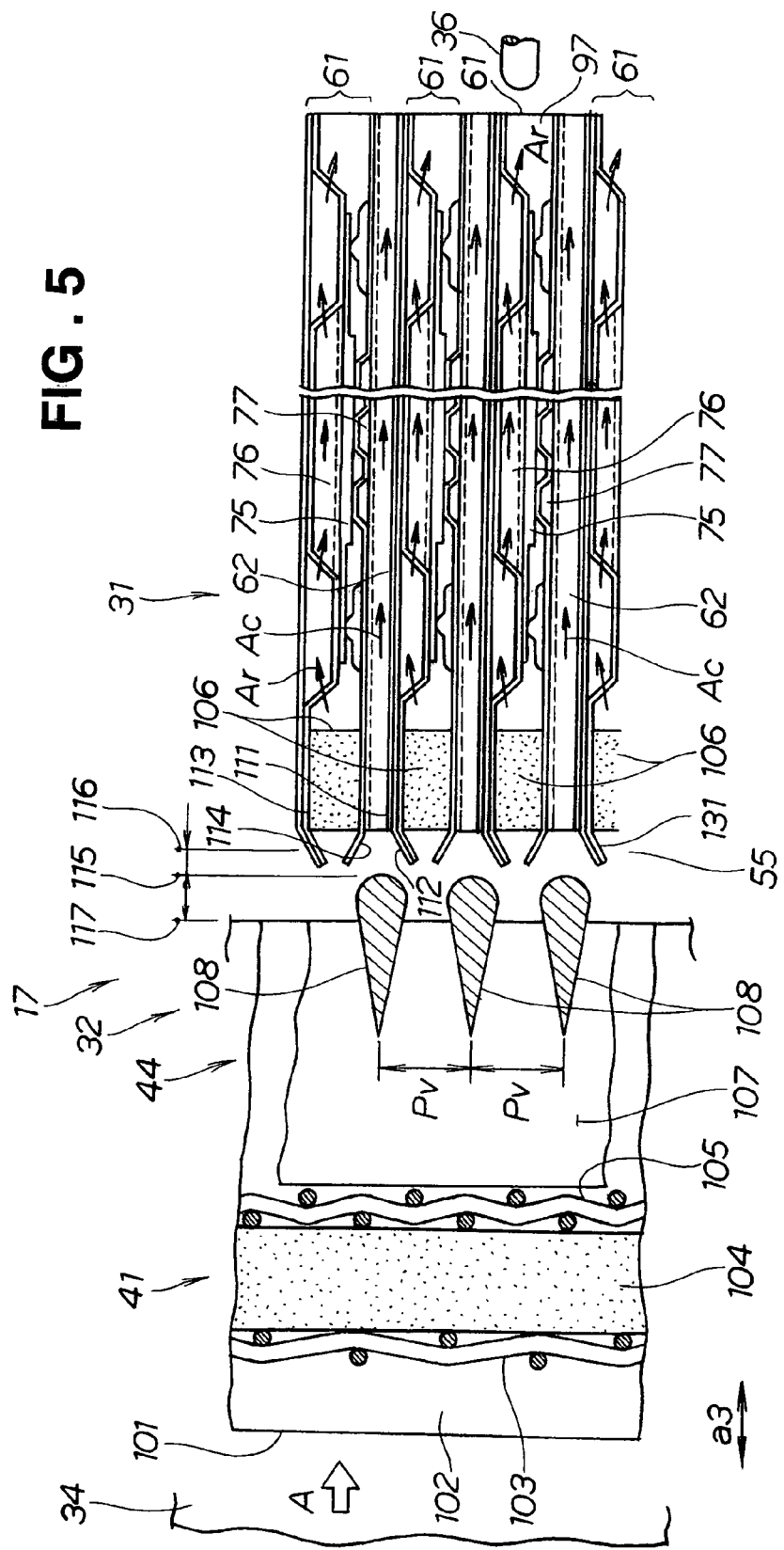
FIG. 5 is a sectional view taken along line 5-5 of FIG. 3.

FIG. 5 is a sectional view taken along the 5-5 line of FIG. 3, which particularly shows one of the stack sections 31 of the fuel cell stack 17, air allocation mechanism 32 disposed in front of the fuel cell stack section 31, air filter section 41, and temperature sensor 36 disposed near the discharge opening 97 of one of the power generating cells 61.

The air filter section 41 includes, sequentially from an outside 102, a large-mesh metal net 103, coarse filter 104 and fine-mesh metal net 105, which are mounted on a frame 101 of the valve section 44, so as to remove dust, dirt, etc. in the air A.

Each of the power generating cells 61 also includes a fine filter 106 mounted in a reacting-air introduction opening 113 for introducing reacting air Ar into the cell 61. Detailed specification of the fine-mesh filter 106 may be chosen as desired. The reacting-air introduction opening 113 is formed in a front end portion of each of the power generating cells 61 adjacent the front surface 55.

The valve section 44 has the frame 101 fitted in the cell case 34 for sliding movement in a direction of arrow a3 and coupled with the link mechanism 43 (FIG. 2). The valve section 44 also includes: support members 107 (see also FIG. 3) mounted on the frame 101, sheet members 108 having a sectional shape of a raindrop and supported on the support members 107 at a predetermined pitch Pv; sheet surfaces 112 provided in respective cooling-air introduction openings 111 of the cooling-air distributing plates 62; and sheet surfaces 114 provided in respective reacting-air introduction openings 113 of the power generating cells 61 for opening/closing the cooling-air introduction openings 111. Each of the sheet members 108, which is normally held in an original (intermediate) position 115, is caused to slide horizontally, as necessary, between an advance limit position (or closing position) 116 and a retreat limit position (or fully-opening position) 117. Note that the cooling-air introduction opening 111 is formed in a front end portion of each of the cooling cells 62, adjacent the front stack surface 55, that faces forward when the fuel cell stack 17 is duly mounted on the vehicle.

Namely, in the fuel cell stack 17 of the present invention, each of the solid polymer electrolytes (electrolyte/electrode structures) 75 is held between the anode electrode 75*b* and the cathode electrode 75*a*, and fuel gas (hydrogen) is supplied to the anode electrode while reacting air Ar is supplied to the cathode electrode. The power generating cells 61, each generally in the shape of a flat plate, are provided to generate electric power by reacting the fuel gas (hydrogen) with the air. The power generating cells 61 and cooling cells (cooling-air distributing plates) 62 are stacked alternately in such a manner that each of the cooling cells (cooling-air distributing plates) 62 is interposed between adjoining two power generating cells 61, and each of the cooling cells 62 passes cooling air Ac between two opposed flat plates thereof. Each of the power generating cells 61 has the reacting-air introduction opening 113 adjacent the front surface 55 (i.e., surface facing forward when the fuel cell stack 17 is duly mounted on the vehicle 11), and each of the cooling cells 62 has the cooling-air introduction opening 111 adjacent the front surface 55. Further, in the fuel cell stack 17, the air allocation mechanism 32 is provided, in front of the front surface 55, for allocating air A, flowing in the front-to-rear direction of the vehicle 11 (see FIG. 5), to the reacting-air introduction opening 113 and cooling-air introduction opening 111 as reacting air Ar and cooling air Ac, with a variable allocation ratio. Namely, the air allocation mechanism 32 is also capable of varying or adjusting the allocation ratio between the reacting air Ar and the cooling air Ac.

Figure 6:
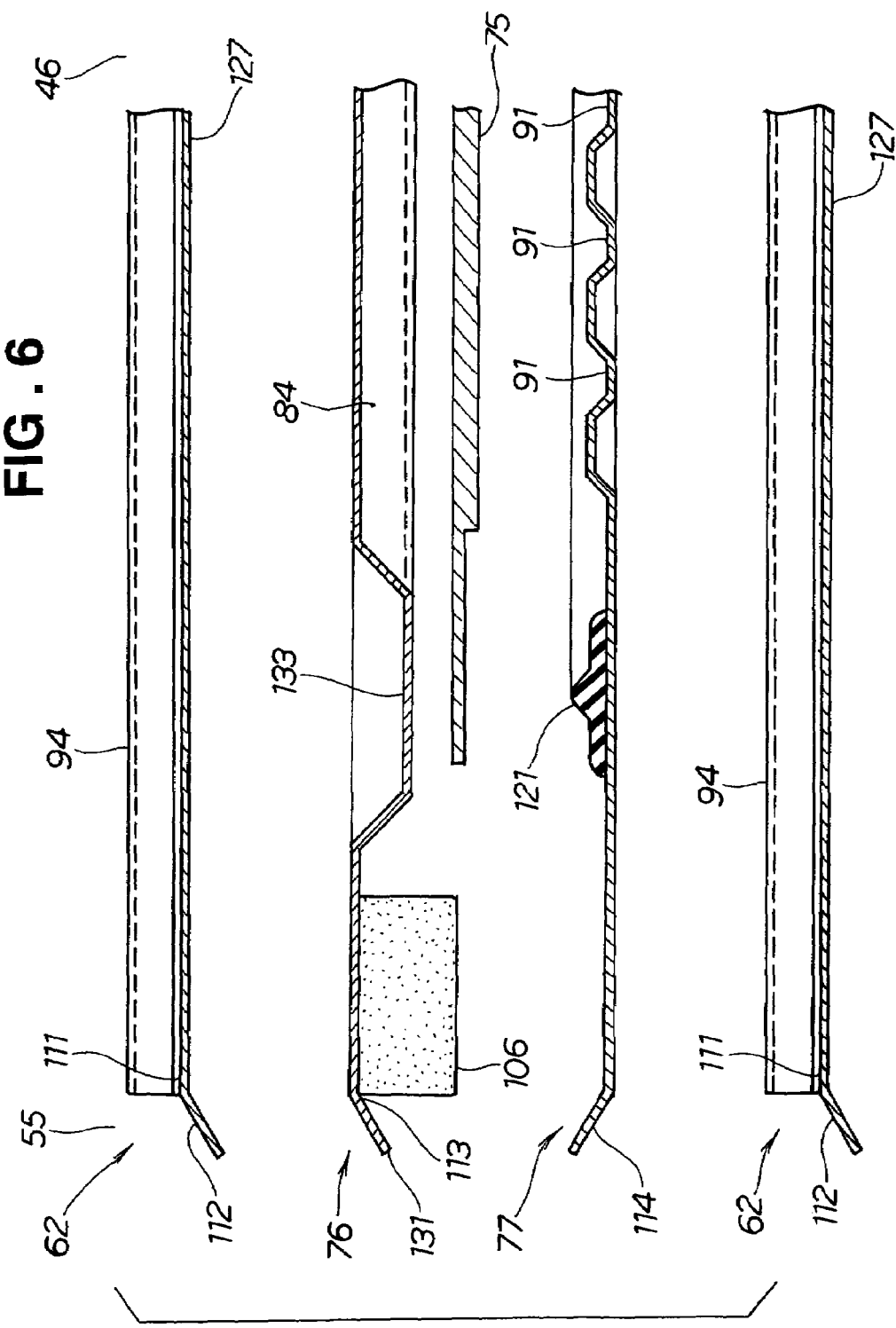
FIG. 6 is a sectional view of a power generating cell and cooling cell in the fuel cell stack.

FIG. 6 is a sectional view of the power generating cell and cooling cell in the fuel cell stack 17 operated or controlled in accordance with the present invention. As shown, each of the cooling cells (cooling-air distributing plates) 62 has the plurality of linear cooling-air flow passageways 94 extending from near the front surface 55 toward the rear surface 46.

The cathode-side separator 76 has the plurality of linear reacting-air flow passageways 84 extending from near the front surface 55 toward the rear surface 46. The anode-side separator 77 has the linear hydrogen flow passageways 91, and a packing 121.

Figure 7:
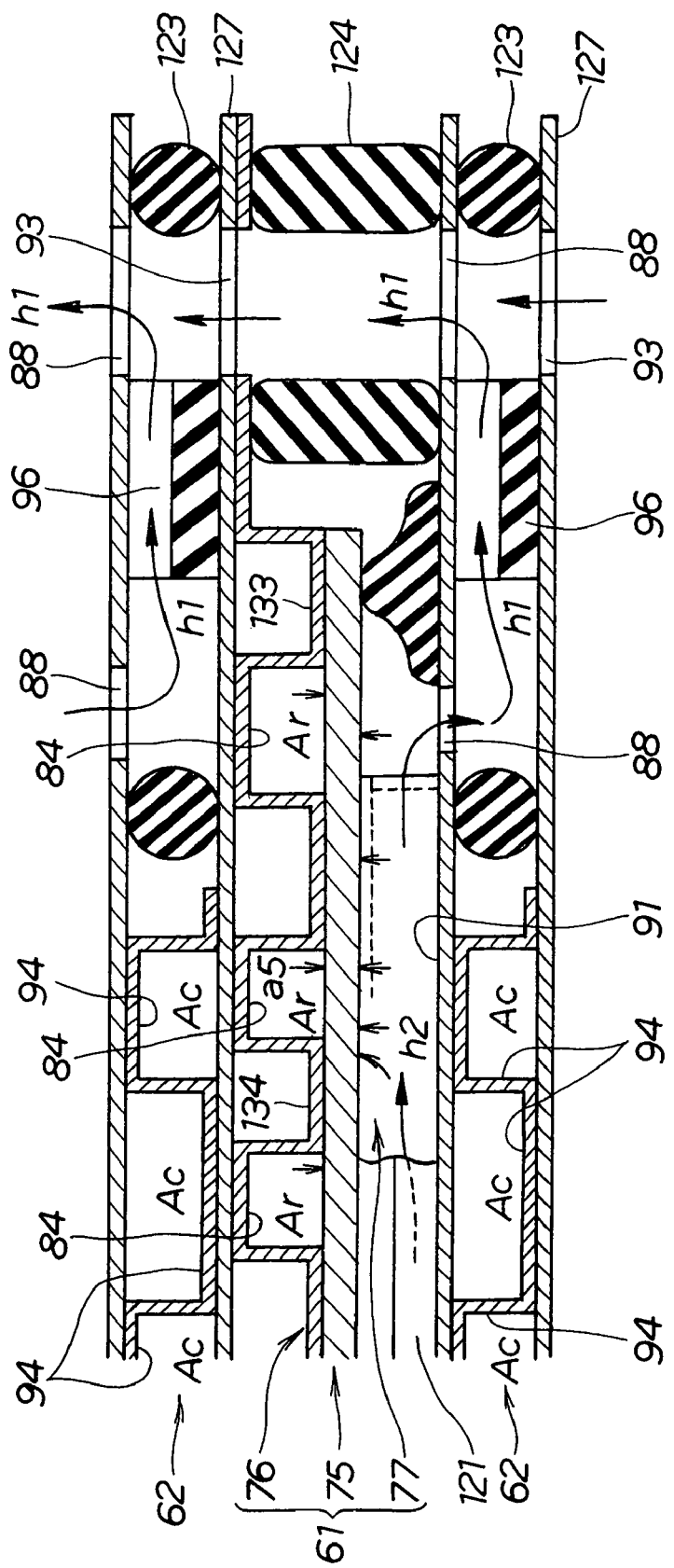
FIG. 7 is a sectional view taken along line 7-7 of FIG. 4.

FIG. 7 is a sectional view taken along the 7-7 line of FIG. 4, which particularly shows the power generating cell 61 and cooling-air distributing plate 62. In the cooling-air distributing plate 62, the cooling-air flow passageways 94 direct the cooling air Ac in a direction perpendicular to the sheet of the figure, and the second flow adjusting member 96, located adjacent to the hydrogen discharge opening 93, directs hydrogen, discharged from the hydrogen discharge openings 88 of the anode-side separator 77, toward the discharge openings 88, as indicated by arrow h1, so that the hydrogen is discharged from the stack. Similarly, the first flow adjusting member 95, located adjacent to the hydrogen discharge opening 92 (FIG. 4), directs hydrogen toward the hydrogen discharge openings 87 (see FIG. 4) of the anode-side separator 77 in a direction opposite from the direction of arrow h1, although not specifically shown. Reference numeral 123 represents a seal member.

In the anode-side separator 77, the hydrogen flow passageways 91 direct hydrogen, introduced via the hydrogen supply openings 87 (FIG. 4), to the solid polymer electrolyte (electrolyte/electrode structure) 75 as indicated by arrow h2 and to the hydrogen discharge openings 88. Reference numeral 124 (see also FIG. 10) represents a seal member.

In the cathode-side separator 76, the reacting-air flow passageways 84 direct the reacting air Ar in the direction perpendicular to the sheet of the figure and also supplies the reacting air Ar to the solid polymer electrolyte (electrolyte/electrode structure) 75.

Figure 8:
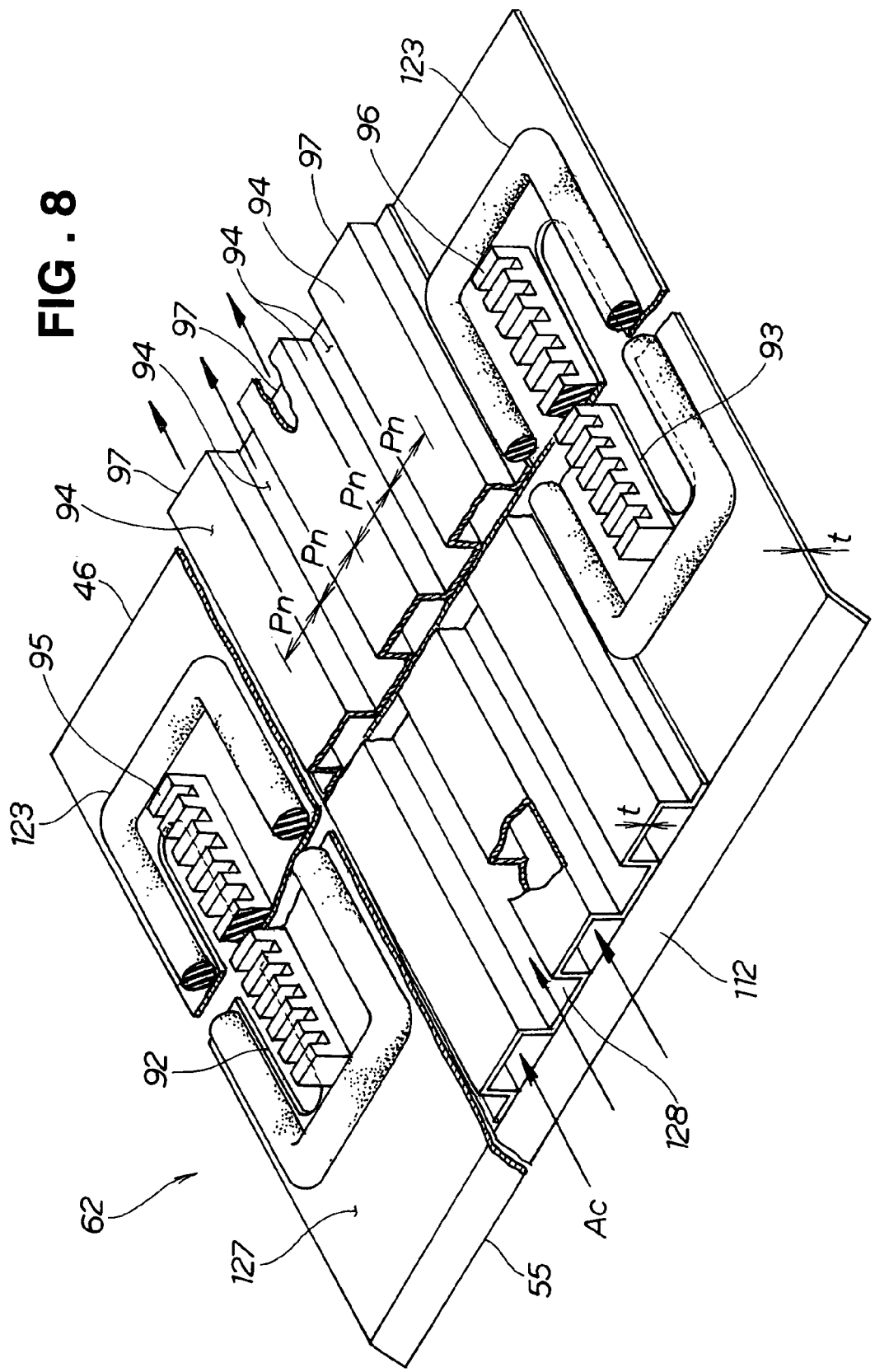
FIG. 8 is a perspective view of the cooling cell in the vehicle-mounted fuel cell stack.

FIG. 8 is a perspective view of the cooling cell in the vehicle-mounted fuel cell stack of the present invention. As shown, each of the cooling cells (cooling-air distributing plates) 62 includes a partitioning base plate section 127 placed on the cathode-side separator 76 (see FIG. 6) and having a channel plate section 128 provided thereon, and the sheet surface 112 formed continuously with one edge of the base plate section 127. The channel plate section 128 defines a predetermined number N of the cooling-air flow passageways 94 at a predetermined pitch Pn.

Because the cooling cell (cooling-air distributing plate) 62 is composed of the partitioning base plate section 127 and channel plate section 128, the sheet surface 112 can be formed easily with no particular labor required, and the reacting-air flow passageways 84 of the cathode-side separator 76 can be simplified in construction as seen in FIG. 7.

Figure 9:
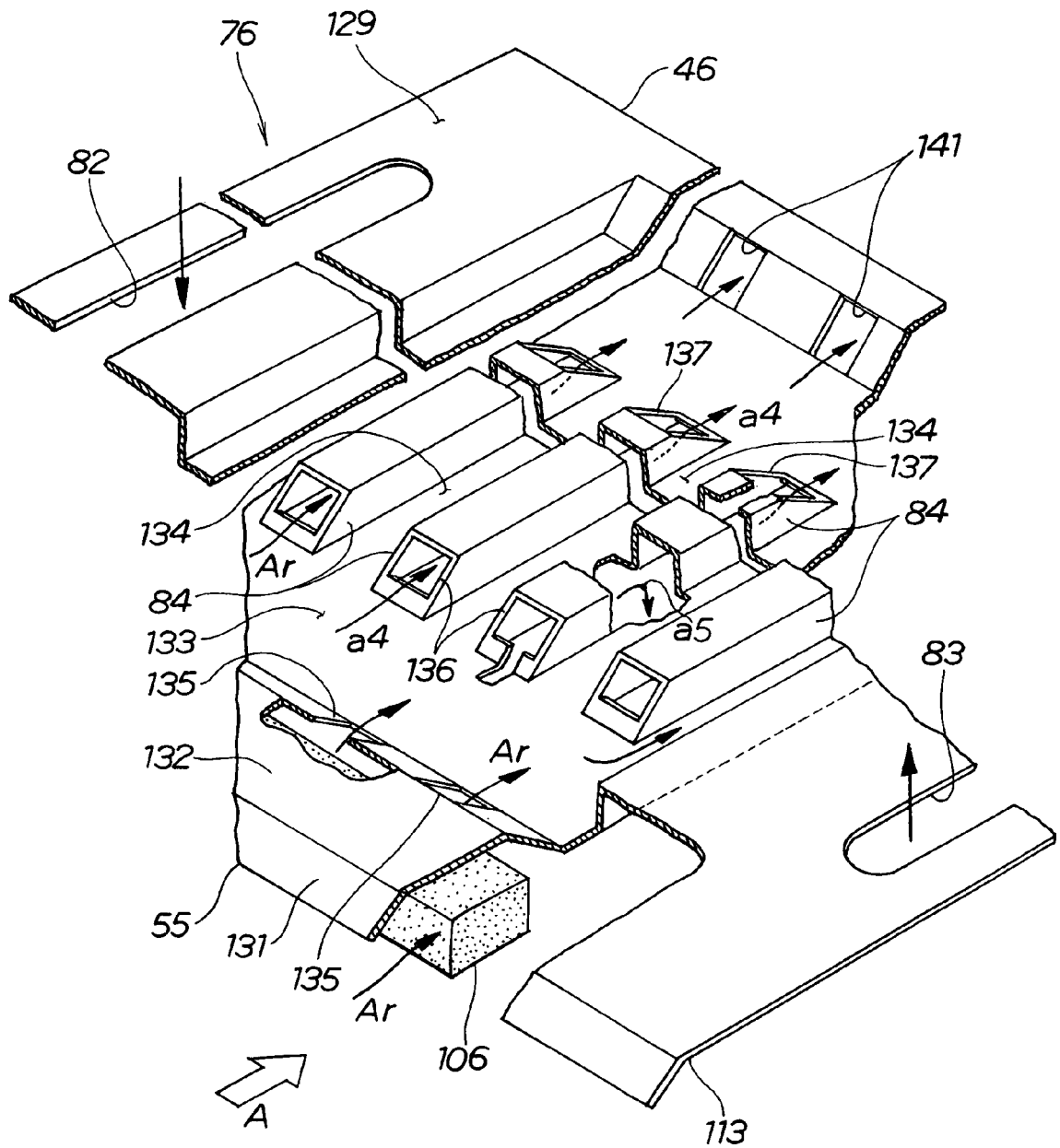
FIG. 9 is a perspective view of a cathode-side separator in the vehicle-mounted fuel cell stack.

FIG. 9 is a perspective view of the cathode-side separator in the vehicle-mounted fuel cell stack of the present invention. Specifically, each of the cathode-side separators 76 includes a backup section 131 formed continuously with the front edge of a thin plate 129 and functioning to support the above-mentioned sheet surface 112 of the cooling cell (cooling-air distributing plate) 62, and a filter-mounting section 132 formed continuously with the backup section 131. Packing/pressing section 133 is formed around the thin plate 129, and the reacting-air flow passageways 84 are formed continuously with the packing/pressing section 133 with electrolyte retaining sections 134 formed therebetween. First openings 135 are formed in the filter-mounting section 132. Second and third openings 136 and 137 are formed in front and rear ends of the hollow reacting-air flow passageways 84, and fourth openings 141 are formed in a rear end portion of the packing/pressing section 133. Further, the hydrogen discharge opening 83 and hydrogen supply opening 82 are formed in left and right side edge portions, respectively, of the packing/pressing section 133. With such arrangements, the reacting air Ar is supplied to the solid polymer electrolyte 75, as indicated by arrow a5, as the air Ar passes along the reacting-air flow passageways 84 as indicated by arrow a4 (see also FIG. 7).

Figure 10:
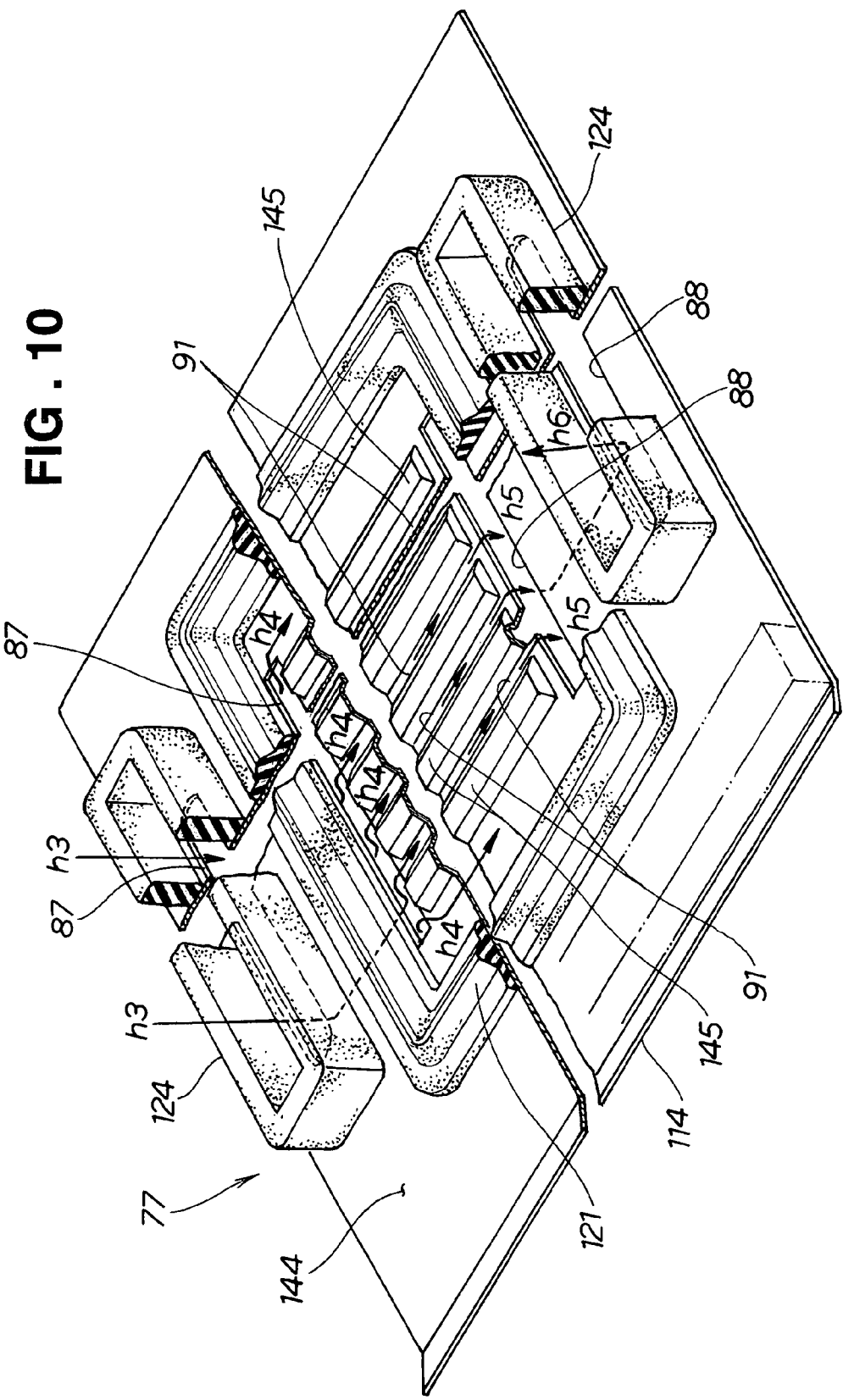
FIG. 10 is a perspective view of an anode-side separator in the vehicle-mounted fuel cell stack.

FIG. 10 is a perspective view of the anode-side separator in the vehicle-mounted fuel cell stack of the present invention. Specifically, each of the anode-side separators 77 includes the sheet surface 114 extending continuously with the front edge of a thin plate 144, the hydrogen discharge openings 88 and hydrogen supply openings 87 are formed in left and right side edge portions of the thin plate 144, and electrolyte support sections 145 are provided centrally on the thin plate 144 with the hydrogen flow passageways 91 defined between the support sections 145. With such arrangements, hydrogen passes the first flow adjusting member 95 (FIG. 4) while flowing in the hydrogen supply openings 87 as indicated by arrow h3, and then it flows from the hydrogen supply openings 87 into the power generating cell 61 as indicated by arrow h4 and is supplied to the solid polymer electrolyte (electrolyte/electrode structure) 75 (FIG. 7) as it flows between the support sections 145. The remaining hydrogen, which has not been supplied to the polymer electrolyte 75, flows in the discharge openings 88 as indicated by arrow h5, passes the second flow adjusting member 96 (see FIG. 7) and then passes through the discharge openings 88 as indicated by arrow h6.

The packing 121 is firmly attached to the outer periphery of the polymer electrolyte 75 (see FIG. 4) to secure a pressure of hydrogen introduced between the electrolyte 75 and the anode-side separator 77.

Figure 11:
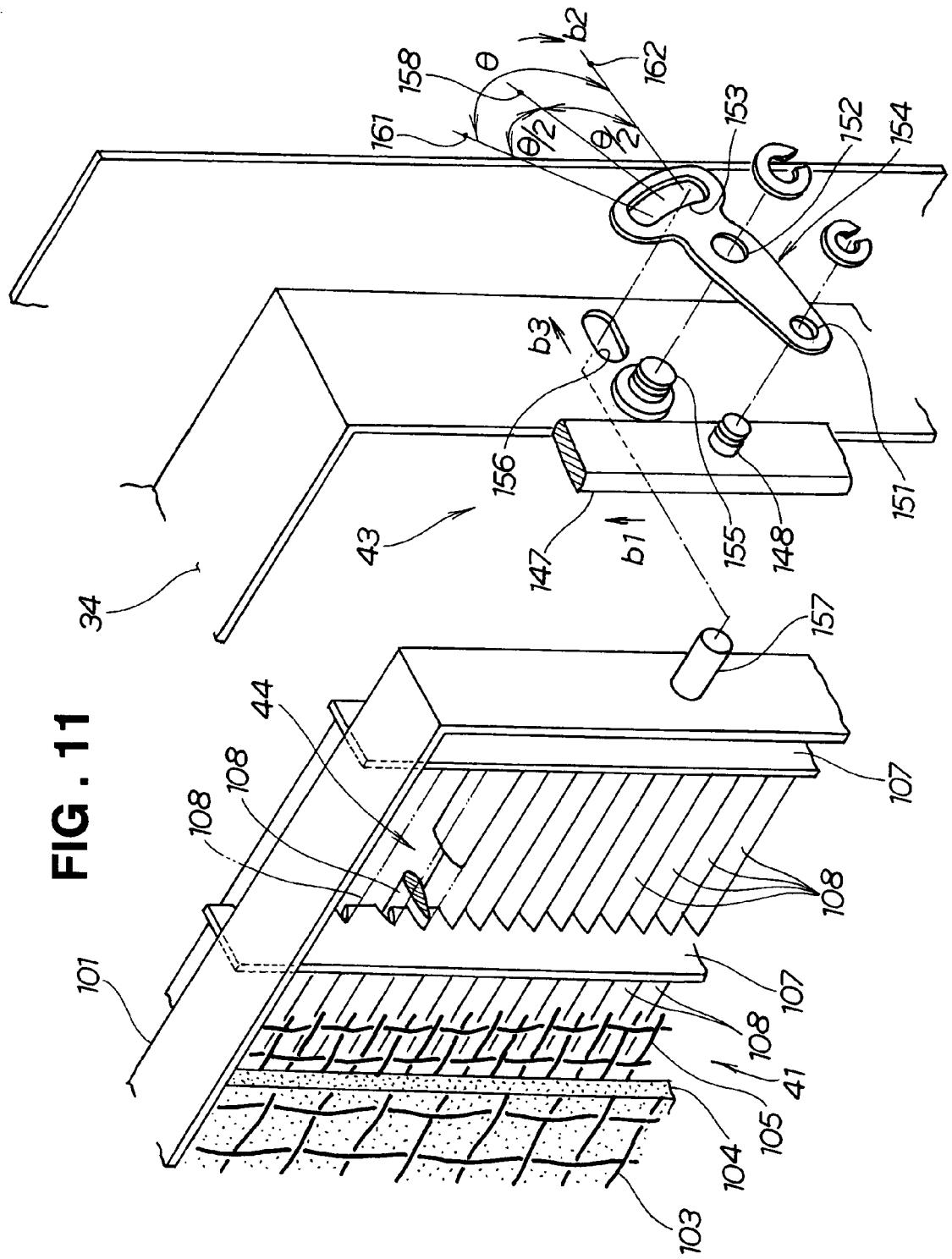
FIG. 11 is an exploded perspective view of a link mechanism of an air allocation mechanism in the vehicle-mounted fuel cell stack.

FIG. 11 is an exploded perspective view of the link mechanism of the air allocation mechanism in the vehicle-mounted fuel cell stack of the present invention. The link mechanism 43 includes a connection bar 147 connected to the opening/closing drive source 42 (FIG. 2) and having a driving boss 148, and a pivot member 154 having a hole 151 fitting in the driving boss 148, central pivot hole 152 and eccentric elongated hole 153 formed in its distal end portion. The link mechanism 43 also includes a support boss 155 formed on the cell case 34 and fitting in the central pivot hole 152 to function as a pivot shaft, a slide hole 156 formed in the cell case 34, and a slide pin 157 formed on the frame 101 and passing through the slide hole 156 to engage with the eccentric elongated hole 153 of the pivoting member 154.

As the connection bar 147 moves upward as indicated by arrow b1, the pivot member 154 pivots through a predetermined angle θ as indicated by arrow b2, so that the slide pin 157 is pressed by the edge of the eccentric elongated hole 153 in a direction of arrow b3. Thus, the frame 101 advances together with the valve section 44 and air filter section 41 until the valve section 44 reaches the advance limit to assume the closing position. Reference numeral 158 represents an original position of the pivot member 154 which corresponds to the above-mentioned original position 116 of FIG. 5. Reference numeral 161 represents an advance limit position which corresponds to the above-mentioned advance limit position 116 of FIG. 5, and 162 a retreat limit position which corresponds to the above-mentioned retreat limit position 117 of FIG. 5.

Figure 12:
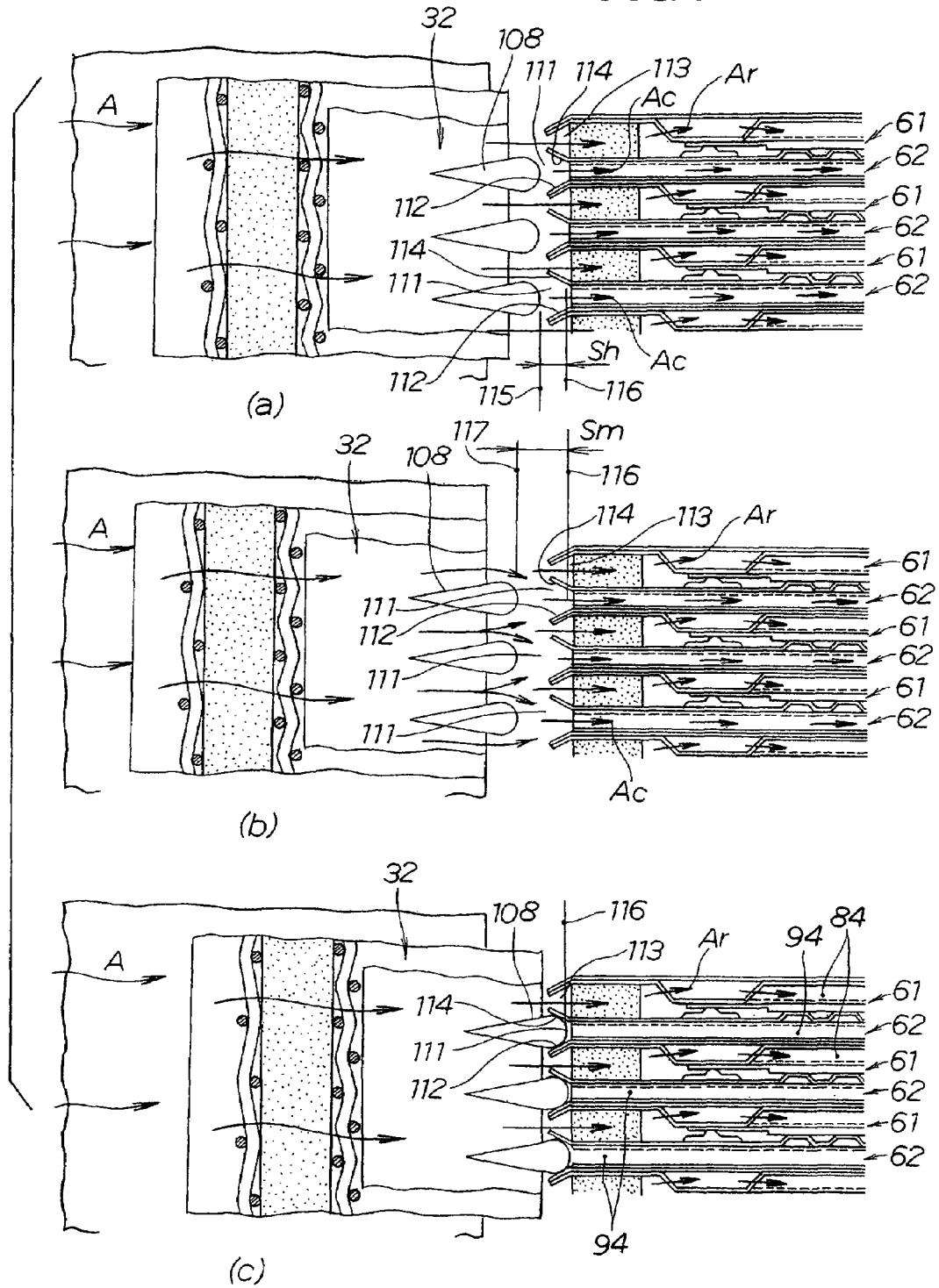
FIG. 12 is a view explanatory of behavior of the air allocation mechanism in the vehicle-mounted fuel cell stack.

FIG. 12 is a view explanatory of the air allocation mechanism 32 in the vehicle-mounted fuel cell stack of the present invention.

In section (a) of FIG. 12, the air allocation mechanism 32 is shown as being in the original (intermediate) position 115 where the mechanism 32 is open about 50%. Namely, when the air allocation mechanism 32 is in the original position 115 through driving by the link mechanism 43 (FIG. 11), the air allocation mechanism 32 is spaced apart from the cooling-air introduction openings 111 (advance limit position 116) by a distance Sh, so that the sheet surfaces 114 and 112 and the sheet members 108 are located apart from each other to provide a 50%-open state of the mechanism 32. Thus, as the vehicle is driven to travel under these conditions, air A flowing in the front-to-rear direction of the vehicle is introduced through the reacting-air introduction openings 113 of the power generating cells 61 as reacting air Ar and also introduced through the openings 111 of the cooling cells 62 as cooling air Ac. In this way, the power generating cells 61 can be cooled by the cooling cells 62.

In section (b) of FIG. 12, the air allocation mechanism 32 is shown as being in the retreat limit position 117 where the mechanism 32 is open about 100%. Namely, when the air allocation mechanism 32 is in the retreat limit position 115 through driving by the link mechanism 43 (FIG. 11), the air allocation mechanism 32 is spaced apart from the cooling-air introduction openings 111 (advance limit position 116) by a distance Sm, so that the sheet surfaces 114 and 112 and the sheet members 108 are located fully apart from each other to provide a 100-% open state of the mechanism 32. Thus, as the vehicle is driven to travel under these conditions, the air A flowing in the front-to-rear direction of the vehicle is introduced through the openings 113 of the power generating cells 61 as the reacting air Ar and also introduced through the cooling-air introduction openings 111 of the cooling cells 62 as the cooling air Ac.

In section (c) of FIG. 12, the air allocation mechanism 32 is in the advance limit position 116 where the mechanism 32 is closed. Namely, when the air allocation mechanism 32 is caused to slide to the advance limit position 115 through driving by the link mechanism 43 (FIG. 11), the sheet members 108 contact the sheet surfaces 114 and 112 defining the openings 111 of the cooling cells 62. Thus, as the vehicle is driven to travel under these conditions, the air A flowing in the front-to-rear direction of the vehicle is introduced through the openings 113 of the power generating cells 61 as the reacting air Ar, but not introduced through the openings 111 of the cooling cells 62 as the cooling air Ac.

Figure 13:
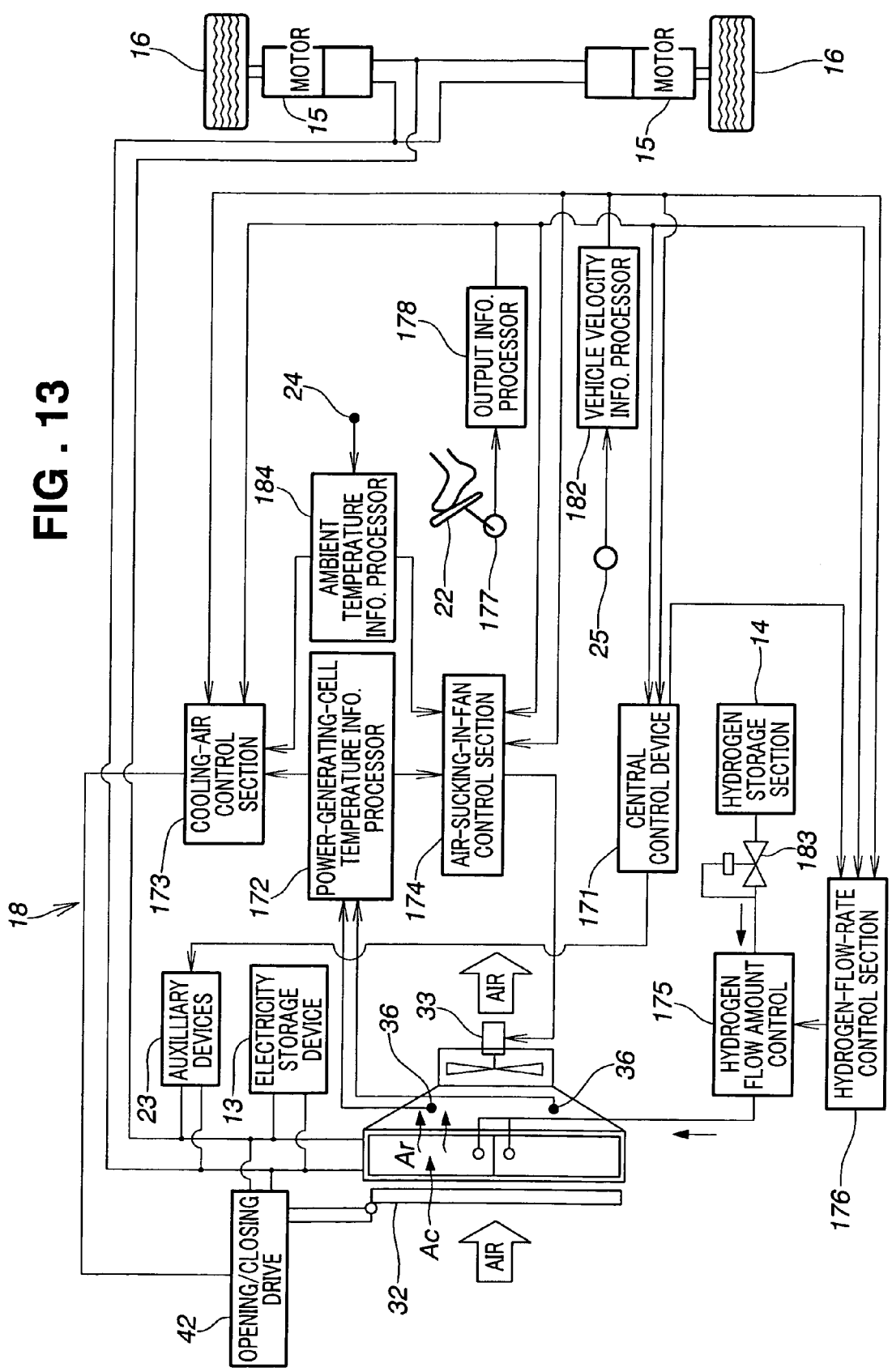
FIG. 13 is a block diagram explanatory of control performed on the vehicle-mounted fuel cell stack in accordance with the present invention.

FIG. 13 is a block diagram explanatory of control performed on the vehicle-mounted fuel cell stack in accordance with the present invention, which is particularly explanatory of the fuel cell control device for controlling the operation of the fuel cell stack.

The fuel cell control device 18 is controlled on the basis of information given from a central control device 171 that controls all the components of the vehicle 11, such as the traveling motors 15. The fuel cell control device 18 includes the temperature sensors 36 for measuring a temperature of the power generating cells 61 (see also FIG. 5), a power-generating-cell temperature processor 172 that outputs temperature detection information of the temperature sensors 36, the ambient temperature sensor 24, and a cooling-air control section 173 that compares the temperature information given from the temperature information processor 172 and preset upper and lower limits of an appropriate operating temperature range of the power generating cells 61 so as to control the opening/closing drive source 42 of the air allocation mechanism 32 on the basis of the comparison result. The fuel cell control device 18 also includes an air-sucking-in-fan control section 174 that compares the temperature information given from the temperature processor 172 and the preset upper and lower limits of the appropriate operating temperature range of the power generating cells 61 so as to control the fan 33 on the basis of the comparison result, and a hydrogen-flow-amount control section 176 for controlling a hydrogen flow amount control 175 on the basis of information from the central control device 171 and/or information from an output sensor 177 coupled to the accelerator pedal 22. The fuel cell control device 18 further includes an output information processor 178 that outputs information of the output sensor 177, the vehicle velocity sensor 25, and a vehicle velocity information processor 182 that outputs information of the vehicle velocity sensor 25. Reference numeral 183 represents a valve for reducing the pressure of the hydrogen, and 184 an ambient temperature information processor.

FIG. 14 is explanatory of how the vehicle-mounted fuel cell stack is operated in accordance with a first aspect of a fuel-cell-stack operation method of the present invention, with reference to FIGS. 1 and 13.

Section (a) of FIG. 14 shows relationship between the time and the amount of generated electric power by the fuel cell stack sections, where the horizontal axis represents the time while the vertical axis represents the amount of generated electric power by the fuel cell stack sections. W1 represents an amount of generated electric power during travel of the vehicle on flat land.

Section (b) of FIG. 14 is a graph showing relationship between the time and the traveling velocity of the vehicle 11 (i.e., vehicle velocity), where the horizontal axis represents the time while the vertical axis represents the vehicle velocity. V1 represents a vehicle velocity during travel of the vehicle 11 on flat land.

Section (c) of FIG. 14 is a graph showing relationship between the time and the flow amount of the hydrogen, where the horizontal axis represents the time while the vertical axis represents the hydrogen flow amount. Qh1 represents a hydrogen flow amount during travel of the vehicle 11 on flat land, and Qhm represents a maximum hydrogen flow amount.

Section (d) of FIG. 14 is a graph showing relationship between the time and the temperature of each of the power generating cells 61 (let it be assumed here that each of the power generating cells 61 takes a same temperature, and the following description is made primarily about a representative one of the cells 61), where the horizontal axis represents the time while the vertical axis represents the power generating cell temperature. t1 represents a power generating cell temperature during travel of the vehicle 11 on flat land. For the fuel cells employing the solid polymer electrolytes (electrolyte/electrode structures) 75, an appropriate electric-power-generation reacting (or appropriate operating) temperature range is 60° C.-90° C., and the lower limit tn of the operating temperature range of the power generating cell is set to, for example, 60° C. while the upper limit tm of the temperature range of the power generating cell is set to, for example, 90° C.

Section (e) of FIG. 14 is a time chart showing time points when the air-sucking-in fan 33 should be activated or turned on, where the horizontal axis represents the time and the vertical axis represents activation and deactivation (ON and OFF) of the fan 33.

Section (f) of FIG. 14 is a time chart showing time points when the opening/closing drive source 42 of the air allocation mechanism 32 should perform its opening operation, where the horizontal axis represents the time and the vertical axis represents "ON" and "OFF" periods of the opening/closing drive source 42.

Section (g) of FIG. 14 is a graph showing relationship between the time and the flow amount of the cooling air, where the horizontal axis represents the time while the vertical axis represents the cooling air flow amount. Qc1 represents a cooling air flow amount during travel of the vehicle on flat land, and Qcm represents a maximum cooling air flow amount.

Section (h) of FIG. 14 is a graph showing relationship between the time and the flow amount of the reacting air, where the horizontal axis represents the time while the vertical axis represents the reacting air flow amount. Qr1 represents a reacting air flow amount during travel of the vehicle on flat land (i.e., amount of traveling amount), and Qrm represents a maximum reacting air flow amount.

The first aspect of the fuel-cell-stack operation method, shown in FIG. 14, is intended for application when the output (electric power output) to the traveling motors 15 increases but the vehicle velocity does not increase, for example, when the vehicle 11 is traveling uphill or pulling another vehicle.

In section (a) and section (b) of FIG. 14, the generated electric power amount and vehicle velocity at and before time point tu1 represent those of a steady-state travel of the vehicle, e.g. travel on flat land. In this case, the air allocation mechanism 32 is set at the normal (intermediate) position as illustrated in section (a) of FIG. 12.

The "steady-state travel" means traveling of the vehicle where: 1) the electric power output to the traveling motors 15 via the accelerator pedal 22 is kept constant to keep constant the vehicle velocity V1, as depicted in section (b) of FIG. 14; 2) hydrogen is supplied from the hydrogen storage section 14 under an environment where the ambient temperature detected via the ambient temperature sensor 24 is in the range of 3° C.-35° C.; 3) the hydrogen flow amount is kept constant at the "Qh1" level at a stage immediately following the hydrogen flow amount control 175, as depicted in section (c); 4) the generated electric power amount is kept constant at the "W1" level through constant electric-power generating reaction, as depicted in section (a); 5) the cooling-air flow amount is kept constant at the "Qc1" level due to the traveling wind, as depicted in section (g); 6) the reacting-air flow amount is kept constant at the "Qr1" level due to the traveling wind, as depicted in section (h); 7) the power generating cell temperature is kept between the upper and lower limits tm and tn of the appropriate operating temperature range, as depicted in section (d); and 8) the operational state of the air-sucking-in fan 33 is set in the "deactivated" (OFF) state, as depicted in section (e).

According to the first aspect of the fuel-cell-stack operation method, the electric power consumed by the traveling motors 15 for causing the vehicle to travel and the traveling velocity of the vehicle 11 are first measured, and then standard electric power is calculated or determined which corresponds to the measured traveling velocity, i.e. which represents a level of electric power that would be consumed by the traveling motors 15 if the vehicle is traveling at the measured traveling velocity. If the measured electric power is greater than the standard electric power, both the air-sucking-in-fan control section 174 and the cooling-air control section 173 judge that the vehicle is traveling uphill or pulling another vehicle. In such a case, the fan control section 174 places the fan 33 in the activated (ON) state for rotation, and the cooling-air control section 173 performs control for increasing the allocated amount of the cooling air Ac by means of the air allocation mechanism 32. As a consequence, the cooling-air flow amount increases so that the power generating cell temperature can be reliably maintained between the upper and lower limits tm and tn of the appropriate electric-power-generation reacting temperature range as depicted in section (g) of FIG. 14. In this way, each of the power generating cells 61 can appropriately operate (generate electric power) in a stabilized manner.

To the conditions for "placing the fan 33 in the activated state for rotation and performing the control to increase the allocated amount of the cooling air Ac by means of the air allocation mechanism 32", there may be added a further condition of the temperature of the power generating cell depicted in section (d). The following paragraphs detail various control operations including those to be performed in the case where the further condition of the temperature of the power generating cell is additionally taken into account.

Once the vehicle 11 starts traveling uphill immediately following the time point Tu1 after continuation of the steady-state travel up to the time point Tu1, a transitional traveling state, in which the vehicle velocity does not stabilize, lasts till time point Tu3. During that time, the vehicle velocity first starts lowering as depicted in section (b), so that the vehicle driver steps on the accelerator pedal 22 in order to prevent the vehicle velocity from decreasing excessively. Information, i.e. signal, of the stepping-on of the accelerator pedal 22 is delivered from the output sensor 177, coupled to the accelerator pedal 22, to the hydrogen flow amount control 175 by way of the output information processor 178 and hydrogen-flow-amount control section 176. Consequently, the hydrogen flow amount control 175 starts increasing the hydrogen flow amount, as illustrated in section (c) of FIG. 14, so that the power generating cell 61 generates electric power greater than the above-mentioned generated electric power amount W1 as illustrated in section (a). In this case, the electric power greater than the above-mentioned amount W1 corresponds to the "measured electric power greater than the standard electric power".

During that time, the temperature of the power generating cell 61 rises as illustrated in section (d) of FIG. 14. Because the vehicle velocity starts lowering immediately following time point Tu1 as depicted in section (b), the cooling-air flow amount, depicted in section (g) of FIG. 14, also starts decreasing, so that the temperature of the power generating cell 61 tends to increase easily and actually continues to increase. Because the vehicle velocity decreases, the reacting air flow amount also starts decreasing as depicted in section (h).

Information, or signal, indicative of the decreasing vehicle velocity is delivered from the vehicle velocity sensor 25, via the vehicle velocity information processor 182, to the fan control section 174.

Namely, following time point Tu2, the fan control section 174 determines, on the basis of the information given from the output information processor 178, that the measured electric power has exceeded the standard electric power (first condition). The fan control section 174 performs information processing based on the information from the vehicle velocity information processor 182, and if the processed result indicates that the vehicle velocity has not increased (second condition), then the fan control section 174 activates (i.e., turns on) the air-sucking-in fan 33, namely, places the fan 33 in the activated (ON) state for rotation.

Further, if it is determined that the temperature of the power generating cell 61 has increased beyond a predetermined temperature ts (as a third condition additional to the above-mentioned first and second conditions), the fan control section 174 activates (i.e., turns on) the air-sucking-in fan 33.

If the cooling-air control section 173 has acquired the same results as the above-mentioned first and second conditions, the opening/closing drive source 42 is operated as to bring the air allocation mechanism 32 to the retreat limit position or fully-opening position 117 (see section (b) of FIG. 12). Consequently, the cooling-air flow amount increases to reach a "Qc3" level at time point Tu3 as depicted in section (g) of FIG. 14 so that the temperature of the power generating cell 61 stops increasing at t2 as depicted in section (d), and then starts decreasing. Then, the temperature of the power generating cell 61 is kept substantially constant following time point Tu4.

Namely, according to the first aspect of the fuel-cell-stack operation method of the present invention, when the vehicle 11 is traveling uphill, for example, the fan 33 is activated so that the reacting-air flow amount is caused to increase up to a "Qr3" level. As a consequence, the hydrogen, having increased to a "Qh2" level, can effect the electric power generating reaction without causing a shortage of oxygen, and thus the generated electric power amount can be increased up to a "W2" level.

Simultaneously, the air allocation mechanism 32 is operated in such a direction as to increase the cooling-air flow amount, and thus the cooling-air flow amount can be increased up to the "Qc3" level to effect efficient cooling.

In a time period following time point Tu3, when the vehicle 11 continues traveling uphill, the reacting-air flow amount and hydrogen flow amount increase as compared to when the vehicle 11 is in the steady traveling state, so that the generated electric power amount increases. Thus, although the vehicle velocity decreases, the fan 33 continues to operate, and the air allocation mechanism 32 is operated in the direction to increase the cooling-air flow amount. As a consequence, the power generating cell temperature can be reliably maintained between the upper and lower limits tm and tn of the appropriate electric-power-generation reacting temperature range, and each of the power generating cells 61 can appropriately operate (generate electric power) in a stabilized manner.

Figure 15:
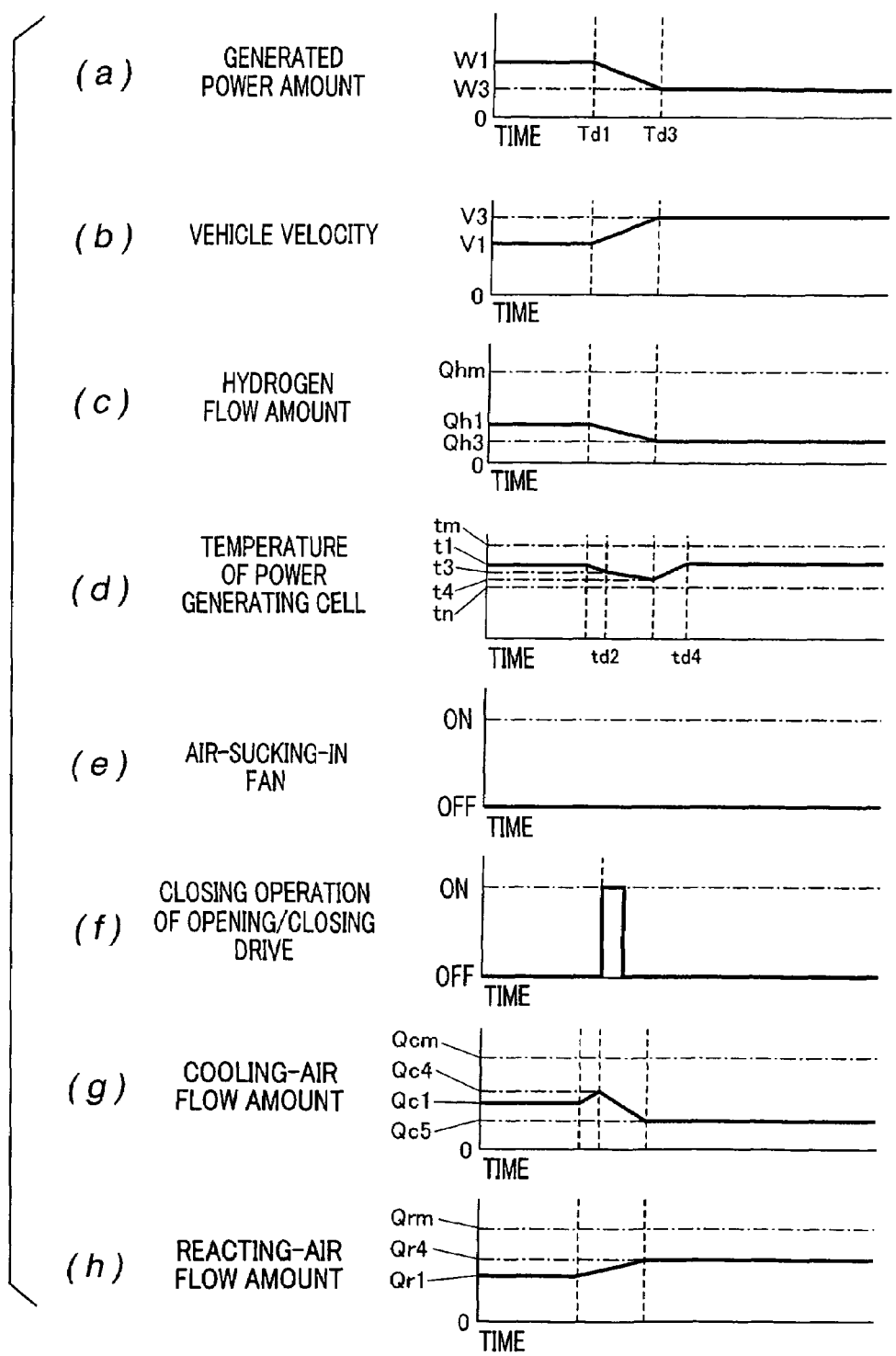
FIG. 15 is a diagram explanatory of how the vehicle-mounted fuel cell stack is operated in accordance with a second aspect of the fuel-cell-stack operation method of the present invention.

FIG. 15 is explanatory of how the vehicle-mounted fuel cell stack 17 is operated or controlled in accordance with a second aspect of the fuel-cell-stack operation method of the present invention, with reference to FIGS. 1 and 13. The same features as already described in relation to FIG. 14 will not be described here to avoid unnecessary duplication.

Section (f) of FIG. 15 is a time chart indicating time points when the opening/closing drive source 42 should perform its opening operation, where the horizontal axis represents the time while the vertical axis represents "ON" and "OFF" periods of the opening operation of the drive source 42.

The second aspect of the fuel-cell-stack operation method shown in FIG. 15 is intended for application when the output (electric power output) to the traveling motors 15 decreases but the vehicle velocity does not decrease, e.g., when the vehicle 11 is traveling downhill.

During travel on flat land, the generated electric power amount is set at W1 as depicted in section (a) of FIG. 15, the vehicle velocity is set at V1 as depicted in section (b), the hydrogen flow amount is set at Qh1 as depicted in section (c), the temperature of the power generating cell is set at t1 as depicted in section (d), the operational state of the air-sucking-in fan 33 is set in the "deactivated" state as depicted in section (e), the closing operation of the opening/closing drive source 42 is set in the "OFF" state, as depicted in section (f), to place the air allocation mechanism 32 in the opening position (see section (a) of FIG. 12), the cooling-air flow amount is set at Qc1 (traveling wind) as depicted in section (g), and the reacting-air flow amount is set at Qr1 (traveling wind) as depicted in section (g).

According to the second aspect of the fuel-cell-stack operation method, the electric power consumed by the traveling motors 15 for causing the vehicle to travel and the traveling velocity of the vehicle 11 are first measured, and then standard electric power is calculated or determined which corresponds to the measured traveling velocity, i.e. which represents a level of electric power that would be consumed by the traveling motors 15 if the vehicle 11 is traveling at the measured traveling velocity. If the measured electric power is lower than the standard electric power, both the air-sucking-in-fan control section 174 and the cooling-air control section 173 judge that the vehicle 11 is traveling downhill. In such a case, the fan control section 174 deactivates the fan 33, and the cooling-air control section 173 performs control for decreasing the allocated amount of the cooling air Ac by means of the air allocation mechanism 32 (see section (c) of FIG. 12). As a consequence, the power generating cell temperature, depicted in section (d) of FIG. 15, can be reliably maintained between the upper and lower limits tm and tn of the appropriate electric-power-generation reacting temperature range, and each of the power generating cells 61 can appropriately operate (generate electric power) in a stabilized manner.

When the vehicle 11 is traveling downhill, the driver operates the accelerator pedal 22 in order to lower the vehicle velocity, so that the hydrogen flow amount decreases from Qh1 to Qh3 and the generated electric power amount decreases as depicted in section (a) of FIG. 15. The electric power smaller than the above-mentioned generated electric power amount W1 corresponds to the "measured electric power smaller than the standard electric power".

Namely, according to the second aspect of the fuel-cell-stack operation method of the present invention, when the vehicle 11 is, for example, traveling downhill, the hydrogen flow amount, depicted in section (c), is decreased to lower the generated electric power amount as depicted in section (a), although the reacting-air flow amount is increased as depicted in section (h), so that the temperature of the power generating cell lowers. Thus, the operational state of the air-sucking-in fan 33 is set to the "deactivated" state as depicted in section (e), which operates the air allocation mechanism 32 in such a direction as to reduce the cooling-air flow amount as depicted in section (g), so that the cooling-air flow amount can be decreased from Qc1 to Qc5.

To the conditions for "placing the fan 33 in the deactivated (OFF) state and performing the control to decrease the amount of the cooling air Ac by means of the air allocation mechanism 32", there may be added further conditions of variation in the vehicle velocity and temperature of the power generating cell depicted in section (d). The following paragraphs detail control operations including those to be performed in the case where the further conditions of the variation in the vehicle velocity and temperature of the power generating cell are additionally taken into account.

As illustrated in section (a) of FIG. 15, the generated electric power amount level W1 is retained through operation of the accelerator pedal 22 so that the steady-state travel of the vehicle 11 lasts till time point Td1. After the vehicle 11 starts traveling downhill immediately following the time point Td1, a transitional traveling state, in which the vehicle velocity does not stabilize, lasts till time point Td3 as depicted in section (b).

Following time point Td1, the fan control section 174 determines, on the basis of the information given from the output information processor 178, that the measured electric power is lower than the standard electric power (first condition). The fan control section 174 performs information processing based on the information from the vehicle velocity information processor 182, and if the processed result indicates that the vehicle velocity, depicted in section (b), has not changed from the steady-state traveling velocity V1 or has increased (toward a "V3" level) as compared to the steady-state traveling velocity V1 (second condition), then the fan control section 174 does not activate the air-sucking-in fan 33.

Alternatively, when it is determined that the temperature of the power generating cell 61 has decreased below a predetermined temperature (e.g., t3) (as a third condition additional to the above-mentioned first and second conditions), the fan control section 174 does not activate the air-sucking-in fan 33, similarly to the above-described.

If the cooling-air control section 173 has acquired, at time point Td2, the same results as the above-mentioned first and second conditions, the opening/closing drive source 42 is operated so as to bring the air allocation mechanism 32 to the advance limit position or closing position 116 (see section (c) of FIG. 12). Consequently, the cooling-air flow amount, having increased up to a "Qc4" level, decreases to a "Qc5" level at time point Td3, so that the temperature of the power generating cell 61 stops decreasing at t4 and then starts increasing as depicted in section (d). Then, the temperature of the power generating cell 61 is kept substantially constant following time point Td4.

Namely, according to the second aspect of the fuel-cell-stack operation method of the present invention, when the vehicle 11 is, for example, traveling downhill, the hydrogen flow amount is decreased to lower the generated electric power amount although the reacting-air flow amount is increased, so that the temperature of the power generating cell lowers. Thus, the operational state of the air-sucking-in fan 33 is set to the "deactivated" state, which operates the air allocation mechanism 32 in the direction to reduce the cooling-air flow amount, so that the cooling-air flow amount can be decreased.

Following time point Td3, the hydrogen flow amount and the generated electric power amount decrease and the vehicle velocity increases as compared to those during the steady-state travel. However, because the fan 33 is kept deactivated and the air allocation mechanism 32 is operated in the direction to reduce the cooling-air flow amount, the power generating cell temperature can be reliably maintained between the upper and lower limits tm and tn of the appropriate electric-power-generation reacting temperature range, with the result that the power generating cell 61 can appropriately operate (generate electric power) in a stabilized manner.

Figure 16:
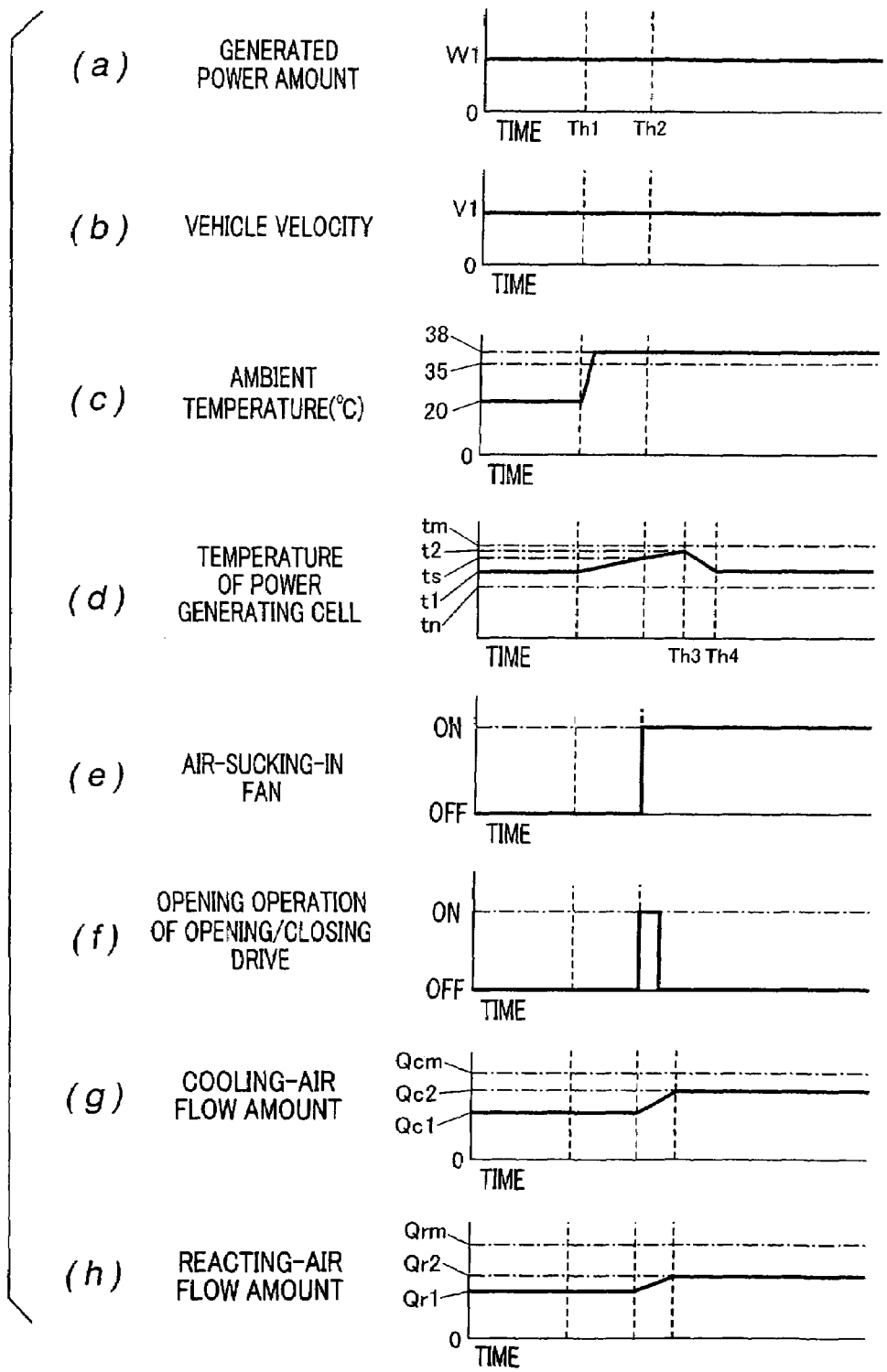
FIG. 16 is explanatory of how the vehicle-mounted fuel cell stack is operated or controlled in accordance with a third aspect of the fuel-cell-stack operation method of the present invention.

FIG. 16 is explanatory of how the vehicle-mounted fuel cell stack 17 is operated or controlled in accordance with a third aspect of the fuel-cell-stack operation method of the present invention, with reference to FIGS. 1 and 13. The same features as already described in relation to FIG. 14 will not be described here to avoid unnecessary duplication. Section (c) of FIG. 16 is a graph plotting relationship between the time and the ambient temperature, where the horizontal axis represents the time while the vertical axis represents the ambient temperature.

The third aspect of the fuel-cell-stack operation method is intended to control the vehicle-mounted fuel cell stack 17 under a high-temperature environment where the ambient temperature is 35° C. or over.

Under an environment where the ambient temperature, depicted in section (c), is 20° C., the steady-state travel is caused to last till time point Th1. During the steady-state travel, the generated electric power amount is set at W1 as depicted in section (a) of FIG. 15, the vehicle velocity is set at V1 as depicted in section (b), the temperature of the power generating cell is set at t1 as depicted in section (d), the operational state of the air-sucking-in fan 33 is set in the "deactivated" state as depicted in section (e), the opening operation of the opening/closing drive source 42 is placed in the "OFF" state, as depicted in section (f), to keep the air allocation mechanism 32 in the normal opening position (see section (a) of FIG. 12), the cooling-air flow amount is set at Qc1 (traveling wind) as depicted in section (g), and the reacting-air flow amount is set at Qr1 (traveling wind) as depicted in section (h).

Standard temperature preset in correspondence with the ambient temperature depicted in section (c) of FIG. 16 is, for example, 35° C. Namely, in this case, the ambient temperature "higher than the preset standard temperature" is a temperature exceeding 35° C.

When the vehicle 11 has been placed in a high-temperature environment where the ambient temperature is over 35° C., e.g. 38° C., the temperature of the power generating cell 61 starts increasing from the t1 level of the steady-state travel and reaches the "ts" level at time point Th2, as depicted in section (d).

Namely, according to the third aspect of the fuel-cell-stack operation method, the ambient temperature is first measured, and, if the measured temperature is higher than the preset standard temperature of 35° C., both the air-sucking-in-fan control section 174 and the cooling-air control section 173 judge that the vehicle is traveling under a high-temperature environment. In such a case, the fan control section 174 places the fan 33 in the activated state for rotation, and the cooling-air control section 173 performs control for increasing the allocated amount of the cooling air Ac by means of the air allocation mechanism 32 (see section (b) of FIG. 12). As a consequence, the cooling-air flow amount increases as depicted in section (g) of FIG. 16, so that the power generating cell temperature can be reliably maintained between the upper and lower limits tm and tn of the appropriate electric-power-generation reacting temperature range. In this way, each of the power generating cells 61 can appropriately operate (generate electric power) in a stabilized manner.

To the conditions for "placing the fan 33 in the activated state for rotation and performing the control to increase the allocated amount of the cooling air Ac by means of the air allocation mechanism 32", there may be added further conditions of variation in the vehicle velocity and the temperature of the power generating cell 61 depicted in section (d). The following paragraphs detail various control operations including those to be performed in the case where the further conditions of variation in the vehicle velocity and the temperature of the power generating cell 61 are additionally taken into account.

If the information from the output sensor 177 coupled to the accelerator pedal (see FIG. 13) has not changed (first condition), the information from the vehicle velocity sensor 25 (see FIG. 13) has not changed (second condition), the ambient temperature has exceeded the preset standard temperature (third condition), and the temperature of the power generating cell 61 has approached the upper limit tm of the appropriate electric-power-generation reacting temperature range, e.g. reached the temperature ts, (fourth condition), the operational state of the air-sucking-in fan 33 is placed in the "activated" state for rotation, and the opening operation of the opening/closing drive source 42 is placed in the "ON" state as depicted in section (f) so that the air allocation mechanism 32 is brought to the retreat limit position or fully-opening position 117 (see section (b) of FIG. 12) or about-70%-opening position. As a consequence, the cooling-air flow amount can be increased up to a "Qc2" level, as depicted in section (g), within a period from time point Th2 to Th3, because of which the increase in the temperature of the power generating cell 61 stops at the "t2" level at time point Th3 and then the temperature starts decreasing, as depicted in section (d). The temperature of the power generating cell 61 continues to decrease till time Th4, after which the cell 61 remains in a substantially-middle temperature range between the upper and lower limits tm and tn. During that time, the reacting-air flow amount increases up to a "Qr2" level through operation of the fan 33.

Note that, whereas the control according to the third aspect of the present invention has been described as using the four, i.e. the first to fourth, conditions, the fourth condition may be omitted, in which case the fuel cell-stack is operated or controlled on the basis of the information of the accelerator pedal output, vehicle velocity and ambient temperature.

Namely, according to the third aspect of the fuel-cell-stack operation method, when the vehicle 11 has been brought from a steady-state traveling environment where the ambient temperature is 20° C. to a high-temperature environment where the ambient temperature is 35° C. or over, the fan 33 is activated and simultaneously the air allocation mechanism 32 is operated in such a direction as to increase the cooling-air flow amount, so that the temperature of the power generating cell 61 can be reliably maintained between the upper and lower limits tm and tn of the appropriate electric-power-generation reacting temperature range. In this way, each of the power generating cells 61 can appropriately operate (generate electric power) in a stabilized manner.

Figure 17:
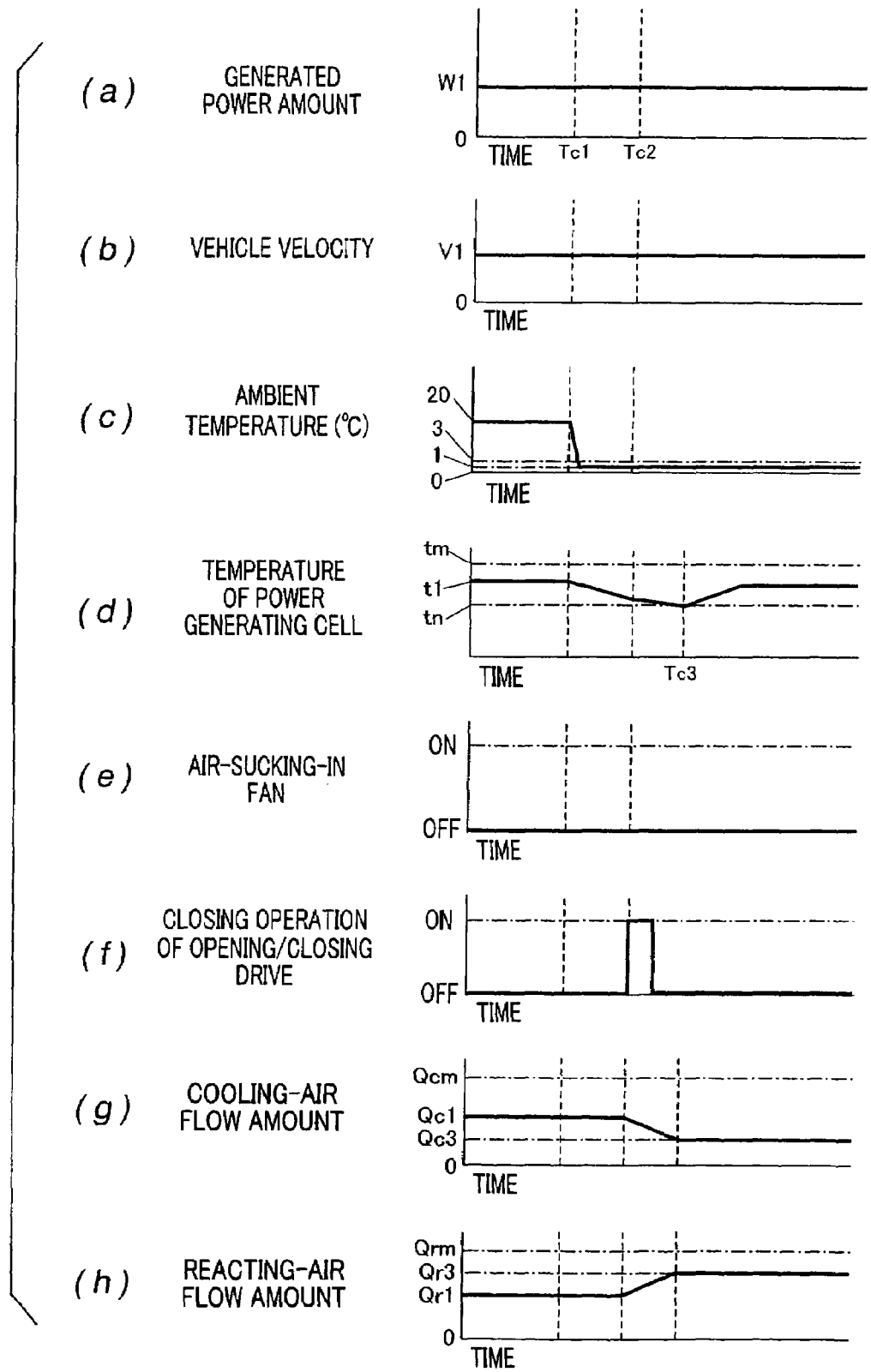
FIG. 17 is explanatory of how the vehicle-mounted fuel cell stack is operated or controlled in accordance with a fourth aspect of the fuel-cell-stack operation method of the present invention.
Figure 18:
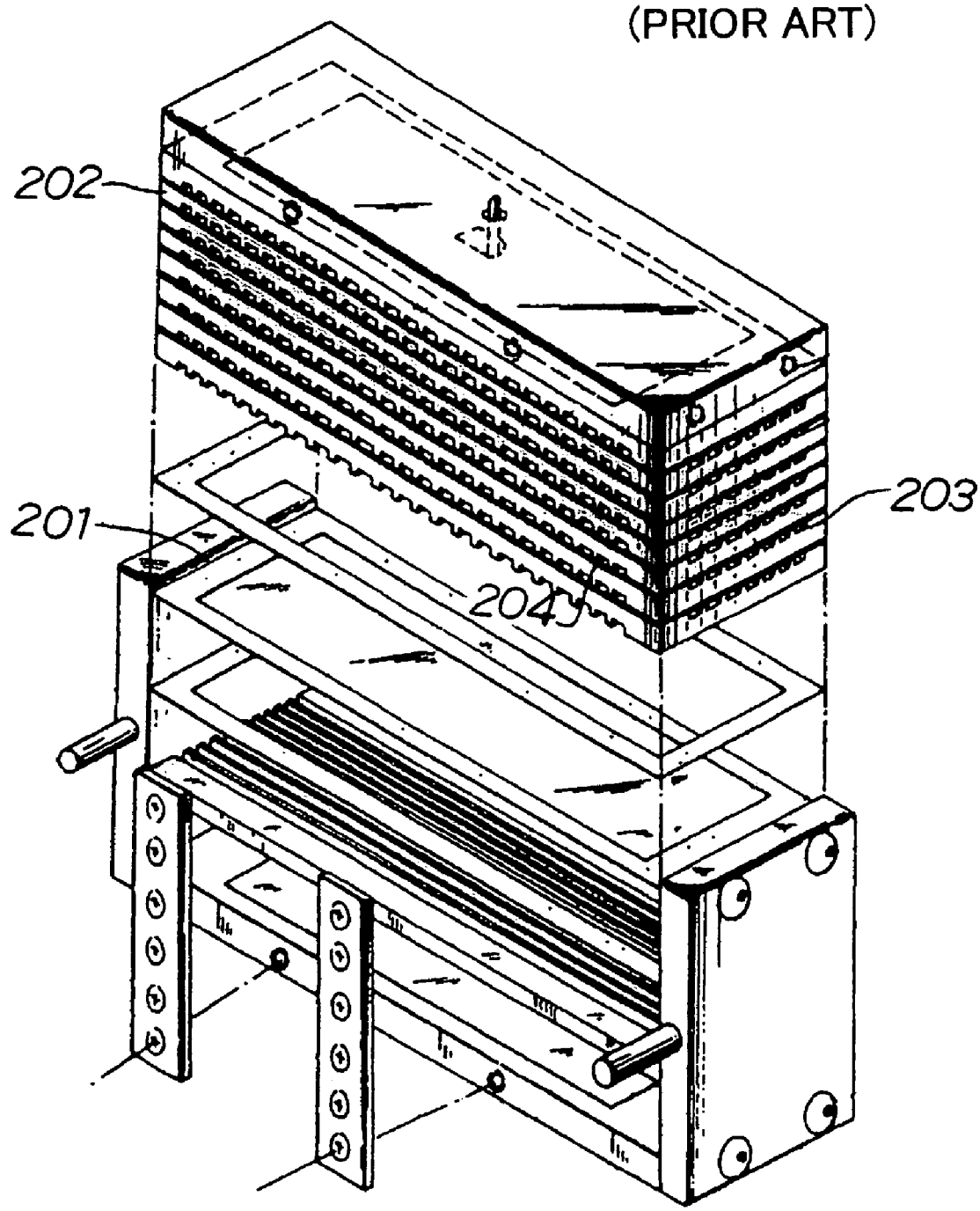
FIG. 18 is a view showing a fundamental construction and operation of a conventional fuel cell stack.

FIG. 17 is explanatory of how the vehicle-mounted fuel cell stack 17 is operated or controlled in accordance with a forth aspect of the fuel-cell-stack operation method of the present invention, with reference to FIGS. 1 and 13. The same features as already described in relation to FIG. 14 will not be described here to avoid unnecessary duplication.

The fourth aspect of the fuel-cell-stack operation method is intended to control the vehicle-mounted fuel cell stack 17 under a low-temperature environment where the ambient temperature is, for example, 3° C. or below.

Under an environment where the ambient temperature, depicted in section (c) of FIG. 17, is 20° C., the steady-state travel of the vehicle 11 is caused to last till time point Tc1. In this case, the standard temperature preset in correspondence with the 20° C. ambient temperature is, for example, 3° C. Namely, the ambient temperature "lower than the preset standard temperature" is a temperature lower than 3° C.

When the vehicle 11 has been placed in a low-temperature environment where the ambient temperature is lower than 3° C., e.g. 1° C., the temperature of the power generating cell 61 starts decreasing from the t1 level of the steady-state travel to near the "tn" level at time point Tc2, as depicted in section (d).

Namely, according to the fourth aspect of the fuel-cell-stack operation method, the ambient temperature is first measured, and, if the measured temperature is lower than the preset standard temperature of 3° C., both the air-sucking-in-fan control section 174 and the cooling-air control section 173 judge that the vehicle is traveling under a lower-temperature environment. In such a case, the fan control section 174 deactivates the fan 33, and the cooling-air control section 173 performs control for decreasing the allocated amount of the cooling air Ac by means of the air allocation mechanism 32. As a consequence, the cooling-air flow amount decreases so that the power generating cell temperature can be reliably maintained between the upper and lower limits tm and tn of the appropriate electric-power-generation reacting temperature range. In this way, each of the power generating cells 61 can appropriately operate (generate electric power) in a stabilized manner.

To the conditions for "placing the fan 33 in the deactivated state and performing the control to decrease the allocated amount of the cooling air Ac by means of variation in the air allocation mechanism 32", there may be added further conditions of the vehicle velocity and the temperature of the power generating cell 61 depicted in section (d). The following paragraphs detail various control operations including those to be performed in the case where the further conditions of variation in the vehicle velocity and the temperature of the power generating cell 61 are additionally taken into account.

If the information from the output sensor 177 coupled to the accelerator pedal (see FIG. 13) has not changed (first condition), the information from the vehicle velocity sensor 25 (see FIG. 13) has not changed (second condition), the ambient temperature has fallen below the standard temperature (third condition), and the temperature of the power generating cell 61 has approached the lower limit tn of the appropriate electric-power-generation reacting temperature range (fourth condition), the operational state of the air-sucking-in fan 33 is kept in the "deactivated" state, and the closing operation of the opening/closing drive source 42 is set in the "ON" state as depicted in section (f) so that the air allocation mechanism 32 is brought to the advance limit position or closing position 116 (see section (c) of FIG. 12) or about-10%-opening position. As a consequence, the cooling-air flow amount can be decreased to the "Qc3" level, as depicted in section (g), within a period from time point Tc2 to Tc3, because of which the decrease in the temperature of the power generating cell 61 stops at time point Tc3 and then the temperature starts increasing, as depicted in section (d). Following time point Tc3, the temperature of the power generating cell 61 remains in a substantially-middle temperature range between the upper and lower limits tm and tn. Due to the decrease of the reacting-air flow amount to the "Qc3" level via the opening/closing drive source 42, the reacting-air flow amount slightly increases from the "Qr1" level to the "Qr3" level within a period from time point Tc2 to time point Tc3 and then remains at the "Qr3" level after time point Tc3.

Note that, whereas the control according to the fourth aspect of the present invention has been described as using the four, i.e. first to fourth, conditions, the fourth condition may be omitted, in which case the fuel cell stack is operated or controlled on the basis of the information of the accelerator pedal output, vehicle velocity and ambient temperature.

Namely, according to the fourth aspect of the fuel-cell-stack operation method, when the vehicle 11 has been brought from a steady-state traveling environment where the ambient temperature is 20° C. to a high-temperature environment where the ambient temperature is 3° C. or less, the air allocation mechanism 32 is operated in such a direction as to decrease the cooling-air flow amount, so that the temperature of the power generating cell 61 can be reliably maintained between the upper and lower limits tm and tn of the appropriate electric-power-generation reacting temperature range.

In this way, each of the power generating cells 61 can appropriately operate (generate electric power) in a stabilized manner.

It should be appreciated that, whereas the vehicle-mounted fuel cell stack operation method of the present invention has been described above as applied to a fuel-cell-powered vehicle, it may be applied to any other vehicles including two-wheeled vehicles.

However, the vehicle-mounted fuel cell stack operation method of the present invention is particularly suited for use in fuel-cell-powered vehicles.

Obviously, various minor changes and modifications of the present invention are possible in the light of the above teaching. It is therefore to be understood that within the scope of the appended claims the invention may be practiced otherwise than as specifically described.

What is claimed is:

1. A method for operating a vehicle-mounted fuel cell stack, said vehicle-mounted fuel cell stack comprising: (a) a plurality of power generating cells each of which is generally in a shape of a flat plate and includes a solid polymer electrolyte membrane sandwiched between an anode electrode and a cathode electrode, each of said power generating cells generating electric power through reaction, via the solid polymer electrolyte membrane, between fuel gas and reacting air supplied to the anode electrode and cathode electrode, respectively, each of said power generating cells having, a reacting-air introduction opening for introducing the reacting air into said power generating cell; (b) one or more cooling cells stacked alternately with said power generating cells, each of said cooling cells including two opposed flat plates for passage therebetween of cooling air and having a cooling-air introduction opening for introducing the cooling air between the opposed flat plates; and (c) an air allocation mechanism for allocating traveling wind or a stream of air, produced via a fan, to the reacting-air introduction openings and to the cooling-air introduction openings as the reacting air and cooling air, respectively, said air allocation mechanism being capable of adjusting an allocation ratio between the reacting air and the cooling air, said method comprising:
measuring electric power consumed by a traveling motor for causing the vehicle to travel;
measuring a traveling velocity of the vehicle;
determining standard electric power that corresponds to the measured consumed electric power, said standard electric power representing a level of electric power that would be consumed by said traveling motor if the vehicle travels on flat land at the measured traveling velocity;
determining that the measured consumed electric power is greater than the standard electric power;
determining that the vehicle velocity has not increased:
determining that a temperature of the power generating cells increases beyond a;
placing said fan in an activated state for rotation; and
operating the air allocation mechanism to increase an allocated amount of the cooling air and to prevent the temperature of the power generating cells from increasing further; wherein the air allocation mechanism comprises an opening/closing drive source, a link mechanism coupled to the opening/closing drive source and a valve driven via the link mechanism, wherein the step of operating the air allocation mechanism further comprises: operating the link mechanism to increase a distance between the cooling-air introduction opening and the air allocation mechanism; placing the air allocation mechanism in a retreat limit position where the air allocation mechanism is opened; introducing a portion of the traveling wind or the stream of air, produced via the fan, as the reacting air; and introducing a remaining portion of the traveling wind or a stream of air, produced via the fan, as the cooling air through the cooling-air introduction opening.

2. A method for operating a vehicle-mounted fuel cell stack, said vehicle-mounted fuel cell stack comprising: (a) a plurality of power generating cells each of which is generally in a shape of a flat plate and includes a solid polymer electrolyte membrane sandwiched between an anode electrode and a cathode electrode, each of said power generating cells generating electric power through reaction, via the solid polymer electrolyte membrane, between fuel gas and reacting air supplied to the anode electrode and cathode electrode, respectively, each of said power generating cells having a reacting-air introduction opening for introducing the reacting air into said power generating cell; (b) one or more cooling cells stacked alternately with said power generating cells, each of said cooling cells including two opposed flat plates for passage therebetween of cooling air and having a cooling-air introduction opening for introducing the cooling air between the opposed flat plates; and (c) an air allocation mechanism for allocating traveling wind or a stream of air, produced via a fan, to the reacting-air introduction openings and to the cooling-air introduction openings as the reacting air and cooling air, respectively, said air allocation mechanism being capable of adjusting an allocation ratio between the reacting air and the cooling air, said method comprising:
measuring electric power consumed by a traveling motor for causing the vehicle to travel;
measuring a traveling velocity of the vehicle;
determining standard electric power that corresponds to the measured consumed electric power, said standard electric power representing a level of electric power that would be consumed by said traveling motor if the vehicle travels on flat land at the measured traveling velocity; and
determining that the measured consumed electric power is lower than the standard electric power;
determining that the vehicle velocity has increased or has stayed the same;
determining that a temperature of the power generating cells decreases below a temperature;
placing said fan in a deactivated state; and
operating the air allocation mechanism to decrease an allocated amount of the cooling air and to prevent the temperature of the power generating cells from decreasing further; wherein the air allocation mechanism comprises an opening/closing drive source, a link mechanism coupled to the opening/closing drive source and a valve driven via the link mechanism, wherein the step of operating the air allocation mechanism further comprises: operating the link mechanism to decrease a distance between the cooling-air introduction opening and the air allocation mechanism; placing the air allocation mechanism in an advance limit position where the air allocation mechanism is closed; introducing the traveling wind or the stream of air, produced via the fan, as the reacting air.

* * * * *